United States Patent
Healy et al.

(10) Patent No.: US 10,821,853 B2
(45) Date of Patent: Nov. 3, 2020

(54) VEHICLE ENERGY MANAGEMENT SYSTEM AND RELATED METHODS

(71) Applicant: HYLIION INC., Pittsburgh, PA (US)

(72) Inventors: Thomas Joseph Healy, South Easton, MA (US); Wilson Sa, Pittsburgh, PA (US); Morgan Culbertson, Shadyside, PA (US); Eric Schmidt, Bridgeville, PA (US); Roger Richter, Leander, TX (US)

(73) Assignee: HYLIION INC., Cedar Park, TX (US)

( * ) Notice: Subject to any disclaimer, the term of this patent is extended or adjusted under 35 U.S.C. 154(b) by 206 days.

(21) Appl. No.: 15/721,345

(22) Filed: Sep. 29, 2017

(65) Prior Publication Data
US 2018/0093655 A1    Apr. 5, 2018

Related U.S. Application Data

(60) Provisional application No. 62/403,026, filed on Sep. 30, 2016, provisional application No. 62/460,734, filed on Feb. 17, 2017.

(51) Int. Cl.
*B60L 58/13*    (2019.01)
*B60W 20/12*    (2016.01)
(Continued)

(52) U.S. Cl.
CPC ............. *B60L 58/13* (2019.02); *B60K 6/40* (2013.01); *B60K 6/448* (2013.01); *B60K 6/52* (2013.01);
(Continued)

(58) Field of Classification Search
CPC ........... B60W 20/12; B60W 30/18127; B60W 10/08; B60W 10/06; B60W 20/10;
(Continued)

(56) References Cited

U.S. PATENT DOCUMENTS

| | | |
|---|---|---|
| 4,199,037 A | 4/1980 | White |
| 5,488,352 A | 1/1996 | Jasper |

(Continued)

FOREIGN PATENT DOCUMENTS

| | | |
|---|---|---|
| CA | 2457216 A1 | 8/2004 |
| CN | 105626768 B | * 11/2017 |

(Continued)

OTHER PUBLICATIONS

Zulkifli, S.A.: "Split-Parallel Through-the-Road Hybrid Electric Vehicle: Operation, Power Flow and Control Modes", 2015 IEEE Transportation Electrification Conference and Expo (ITEC), Jun. 17, 2015 (Jun. 17, 2015), pp. 107.

(Continued)

*Primary Examiner* — Rodney A Butler

(57) ABSTRACT

A through the road (TTR) hybridization strategy is proposed to facilitate introduction of hybrid electric vehicle technology in a significant portion of current and expected trucking fleets. In some cases, the technologies can be retrofitted onto an existing vehicle (e.g., a truck, a tractor unit, a trailer, a tractor-trailer configuration, at a tandem, etc.). In some cases, the technologies can be built into new vehicles. In some cases, one vehicle may be built or retrofitted to operate in tandem with another and provide the hybridization benefits contemplated herein. By supplementing motive forces delivered through a primary drivetrain and fuel-fed engine with supplemental torque delivered at one or more electrically-powered drive axles, improvements in overall fuel efficiency and performance may be delivered, typically without significant redesign of existing components and systems that have been proven in the trucking industry.

20 Claims, 20 Drawing Sheets

(51) Int. Cl.

| | |
|---|---|
| *B60K 11/06* | (2006.01) |
| *B60L 50/70* | (2019.01) |
| *B60L 50/60* | (2019.01) |
| *B60W 10/08* | (2006.01) |
| *B60L 58/24* | (2019.01) |
| *B60K 17/35* | (2006.01) |
| *B60K 17/36* | (2006.01) |
| *B62D 59/04* | (2006.01) |
| *B60K 6/40* | (2007.10) |
| *B60W 20/14* | (2016.01) |
| *B60K 6/52* | (2007.10) |
| *B62D 53/06* | (2006.01) |
| *B60L 1/00* | (2006.01) |
| *B60L 50/15* | (2019.01) |
| *B60L 1/02* | (2006.01) |
| *B60L 58/26* | (2019.01) |
| *B60K 17/356* | (2006.01) |
| *B60K 6/448* | (2007.10) |
| *B60L 7/18* | (2006.01) |
| *B60L 50/16* | (2019.01) |
| *B60L 50/40* | (2019.01) |
| *B60W 10/06* | (2006.01) |
| *B60W 30/18* | (2012.01) |
| *B60W 20/10* | (2016.01) |
| *B60K 1/04* | (2019.01) |
| *B60K 1/00* | (2006.01) |

(52) U.S. Cl.
CPC ............ *B60K 11/06* (2013.01); *B60K 17/356* (2013.01); *B60K 17/36* (2013.01); *B60L 1/003* (2013.01); *B60L 1/02* (2013.01); *B60L 7/18* (2013.01); *B60L 50/15* (2019.02); *B60L 50/16* (2019.02); *B60L 50/40* (2019.02); *B60L 50/60* (2019.02); *B60L 50/70* (2019.02); *B60L 58/24* (2019.02); *B60L 58/26* (2019.02); *B60W 10/06* (2013.01); *B60W 10/08* (2013.01); *B60W 20/10* (2013.01); *B60W 20/12* (2016.01); *B60W 20/14* (2016.01); *B60W 30/18127* (2013.01); *B62D 53/06* (2013.01); *B62D 59/04* (2013.01); *B60K 1/04* (2013.01); *B60K 2001/005* (2013.01); *B60K 2001/0444* (2013.01); *B60L 2200/28* (2013.01); *B60L 2200/36* (2013.01); *B60L 2200/46* (2013.01); *B60L 2240/12* (2013.01); *B60L 2240/14* (2013.01); *B60L 2240/26* (2013.01); *B60L 2240/423* (2013.01); *B60L 2240/443* (2013.01); *B60L 2240/463* (2013.01); *B60L 2240/62* (2013.01); *B60L 2240/64* (2013.01); *B60L 2240/66* (2013.01); *B60L 2240/68* (2013.01); *B60L 2250/26* (2013.01); *B60L 2260/26* (2013.01); *B60L 2260/28* (2013.01); *B60L 2270/40* (2013.01); *B60L 2270/46* (2013.01); *B60W 2300/126* (2013.01); *B60W 2300/14* (2013.01); *B60W 2300/145* (2013.01); *B60W 2510/0657* (2013.01); *B60W 2510/18* (2013.01); *B60W 2510/244* (2013.01); *B60W 2510/246* (2013.01); *B60W 2520/403* (2013.01); *B60W 2552/00* (2020.02); *B60W 2555/20* (2020.02); *B60W 2710/083* (2013.01); *B60W 2710/248* (2013.01); *B60W 2710/30* (2013.01); *B60W 2720/403* (2013.01); *B60Y 2200/14* (2013.01); *B60Y 2200/142* (2013.01); *B60Y 2200/145* (2013.01); *B60Y 2200/147* (2013.01); *B60Y 2200/148* (2013.01); *B60Y 2200/92* (2013.01); *B60Y 2300/188* (2013.01); *B60Y 2300/18125* (2013.01); *B60Y 2300/28* (2013.01); *Y02T 10/642* (2013.01); *Y02T 10/7005* (2013.01); *Y02T 10/705* (2013.01); *Y02T 10/7044* (2013.01); *Y02T 10/7077* (2013.01); *Y02T 10/7291* (2013.01); *Y02T 90/16* (2013.01); *Y02T 90/162* (2013.01); *Y10S 903/916* (2013.01); *Y10S 903/93* (2013.01)

(58) Field of Classification Search
CPC ........... B60W 20/14; B60W 2720/403; B60W 2710/083; B60W 2520/403; B60W 2510/0657; B60W 2300/145; B60W 2300/14; B60W 2300/126; B60W 2510/18; B60W 2550/14; B60W 2550/12; B60W 2710/248; B60W 2510/246; B60W 2510/244; B60W 2710/30; B60L 58/26; B60L 58/24; B60L 58/13; B60L 58/12; B60L 50/16; B60L 50/15; B60L 50/40; B60L 50/50; B60L 7/18; B60L 1/02; B60L 1/003; B60L 2240/463; B60L 2260/26; B60L 2250/26; B60L 2240/68; B60L 2240/66; B60L 2240/64; B60L 2240/62; B60L 2240/443; B60L 2240/423; B60L 2240/26; B60L 2240/14; B60L 2240/12; B60L 2200/46; B60L 2200/36; B60L 2270/46; B60L 2270/40; B60L 2260/28; B60L 2200/28; B60K 17/36; B60K 17/356; B60K 6/52; B60K 6/40; B60K 11/06; B60K 2001/0444; B60K 2001/005; B60K 1/04; B62D 53/06; B62D 59/04; B60Y 2200/142; B60Y 2200/14; B60Y 2200/92; B60Y 2200/145; B60Y 2300/28; B60Y 2200/147; B60Y 2200/148; B60Y 2300/188; B60Y 2300/18125; Y02T 10/642; Y02T 10/7291; Y02T 90/162; Y02T 90/16; Y02T 10/705; Y02T 10/7005; Y02T 10/7044; Y02T 10/7077; Y10S 903/93; Y10S 903/916

See application file for complete search history.

(56) References Cited

U.S. PATENT DOCUMENTS

| | | |
|---|---|---|
| 5,559,420 A | 9/1996 | Kohchi |
| 6,390,215 B1 | 5/2002 | Kodama |
| 6,516,925 B1 | 2/2003 | Napier |
| 7,147,070 B2 | 12/2006 | Leclerc |
| 7,338,335 B1 | 3/2008 | Messano |
| 8,327,960 B2 | 12/2012 | Couture |
| 8,627,908 B2 | 1/2014 | Wellborn |
| 9,321,357 B2 | 4/2016 | Caldeira |
| 9,457,666 B2 | 10/2016 | Caldeira |
| 9,887,570 B2 | 2/2018 | Johnsen |
| 9,937,819 B2 | 4/2018 | Healy |
| 9,948,136 B2 | 4/2018 | Doane |
| 2002/0038730 A1 | 4/2002 | Bidwell |
| 2002/0056579 A1 | 5/2002 | Cooper |
| 2004/0002794 A1 | 1/2004 | Pillar |
| 2005/0045058 A1 | 3/2005 | Donnelly |
| 2005/0060079 A1 | 3/2005 | Phillips |
| 2007/0193795 A1 | 8/2007 | Forsyth |
| 2008/0169144 A1 | 7/2008 | DeGrave |
| 2008/0174174 A1 | 7/2008 | Burns |
| 2009/0223725 A1 | 9/2009 | Rodriguez |
| 2010/0065344 A1 | 3/2010 | Collings |
| 2010/0141201 A1 | 6/2010 | Littrell |
| 2010/0224430 A1 | 9/2010 | Bennett, Sr. |
| 2010/0252339 A1 | 10/2010 | Bibeau |
| 2010/0282122 A1 | 11/2010 | Mai |

(56) References Cited

U.S. PATENT DOCUMENTS

| | | |
|---|---|---|
| 2011/0042154 A1 | 2/2011 | Bartel |
| 2011/0094807 A1 | 4/2011 | Pruitt |
| 2011/0320078 A1 | 12/2011 | McGill |
| 2012/0167555 A1 | 7/2012 | Frazier |
| 2013/0190998 A1 | 7/2013 | Polimeno |
| 2013/0204501 A1 | 8/2013 | Keeney |
| 2013/0338848 A1 | 12/2013 | Park |
| 2014/0025245 A1 | 1/2014 | Fanourakis |
| 2014/0116077 A1 | 5/2014 | Pierce et al. |
| 2014/0358417 A1* | 12/2014 | Lavoie ............... B62D 15/027 701/300 |
| 2015/0204741 A1 | 7/2015 | Hagan |
| 2015/0298680 A1 | 10/2015 | Matthews |
| 2015/0298684 A1 | 10/2015 | Schwartz |
| 2016/0014252 A1 | 1/2016 | Biderman |
| 2016/0031435 A1 | 2/2016 | O'Connor Gibson |
| 2016/0061611 A1 | 3/2016 | Meyer |
| 2016/0137204 A1 | 5/2016 | Morselli |
| 2016/0318421 A1 | 11/2016 | Healy |
| 2018/0080852 A1* | 3/2018 | Hagan, Jr. ............. B60W 20/10 |

FOREIGN PATENT DOCUMENTS

| | | | |
|---|---|---|---|
| EP | 2985170 A2 | 2/2016 | |
| GB | 2466086 A * | 6/2010 | ............. B62D 11/04 |
| WO | WO 2005012025 A1 | 2/2005 | |
| WO | WO 2015/052567 A1 | 4/2015 | |
| WO | WO 2017/095425 | 6/2017 | |
| WO | WO2018064619 A2 | 4/2018 | |

OTHER PUBLICATIONS

PCT International Search Report, Application No. PCT/US2017/054587, dated Apr. 20, 2018.

PCT International Search Report, Application No. PCT/US2018/018499, dated May 22, 2018.

European Search Report, Application No. 16789915.2, dated Jan. 8, 2018.

Hosein Sagha, Shahrokh Farhangi, Behzad Asaei, "Modeling and Design of a NOx Emission Reduction Strategy for Lightweight Hybrid Electric Vehicles", Published in 35$^{th}$ Annual Conference of IEEE Industrial Electronics, Nov. 3-5, 2009, IEEE (c) 2009, pp. 334-339.

PCT International Search Report and Written Opinion, Application No. PCT/US2017/054595, dated Feb. 8, 2018.

Karbowski, Sokolov, and Rousseau, "Vehicle Energy Management Optimisation through Digital Maps and Connectivity", 22nd ITS World Congress, ITS-1952, Bordeaux, France, Oct. 5-9, 2015.

Lin, Kang, Grizzle, and Peng, "Energy Management Strategy for a Parallel Hybrid Electric Truck", Proceedings of the American Control Conference, 2001, pp. 2878-2883, Digital Object Identifier: 10.1109/ACC.2001.946337.

Zulkifli, Mohd, Saad, and Aziz, "Operation and Control of Split-Parallel, Through-The-Road Hybrid Electric Vehicle With In-Wheel Motors", International Journal of Automotive and Mechanical Engineering, vol. 11, pp. 2793-2808, 2015, Digital Object Identifier: 10.15282/ijame.11.2015.54.0235.

Kural and Guvenc, "Predictive-Equivalent Consumption Minimization Strategy for Energy Management of a Parallel Hybrid Vehicle for Optimal Recuperation", Journal of Polytechnic, 18(3), pp. 113-124, 2015, Digital Object Identifier: 10.2339/2015.18.3, 113-124.

Skugor, Pavkovic, and Deur, "A Series-Parallel Hybrid Electric Vehicle Control Strategy Including Instantaneous Optimization of Equivalent Fuel Consumption", IEEE International Conference on Control Applications, pp. 310-316, 2012.

PCT International Search Report and Written Opinion, Application No. PCT/US2016/030482, dated Aug. 4, 2016.

Musardo, Rizzoni, and Staccia, "A-ECMS: An Adaptive Algorithm for Hybrid Electric Vehicle Energy Management", Proceedings of the 44th IEEE Conference on Decision and Control, 2005, pp. 1816-1823.

Paganelli, Delprat, Guerra, Rimaux, and Santin, "Equivalent Consumption Minimization Strategy for Parallel Hybrid Powertrains", Proceedings of the IEEE 55th Vehicular Technology Conference, 2002, pp. 2076-2081.

Sciarretta, Back, and Guzzella, "Optimal Control of Parallel Hybrid Electric Vehicles", IEEE Transactions on Control Systems Technology, vol. 12, No. 3, pp. 352-363, May 2004.

Sciarretta and Guzzella, "Control of Hybrid Electric Vehicles", IEEE Control Systems Magazine, vol. 27, No. 2, pp. 60-70, Apr. 2007.

* cited by examiner

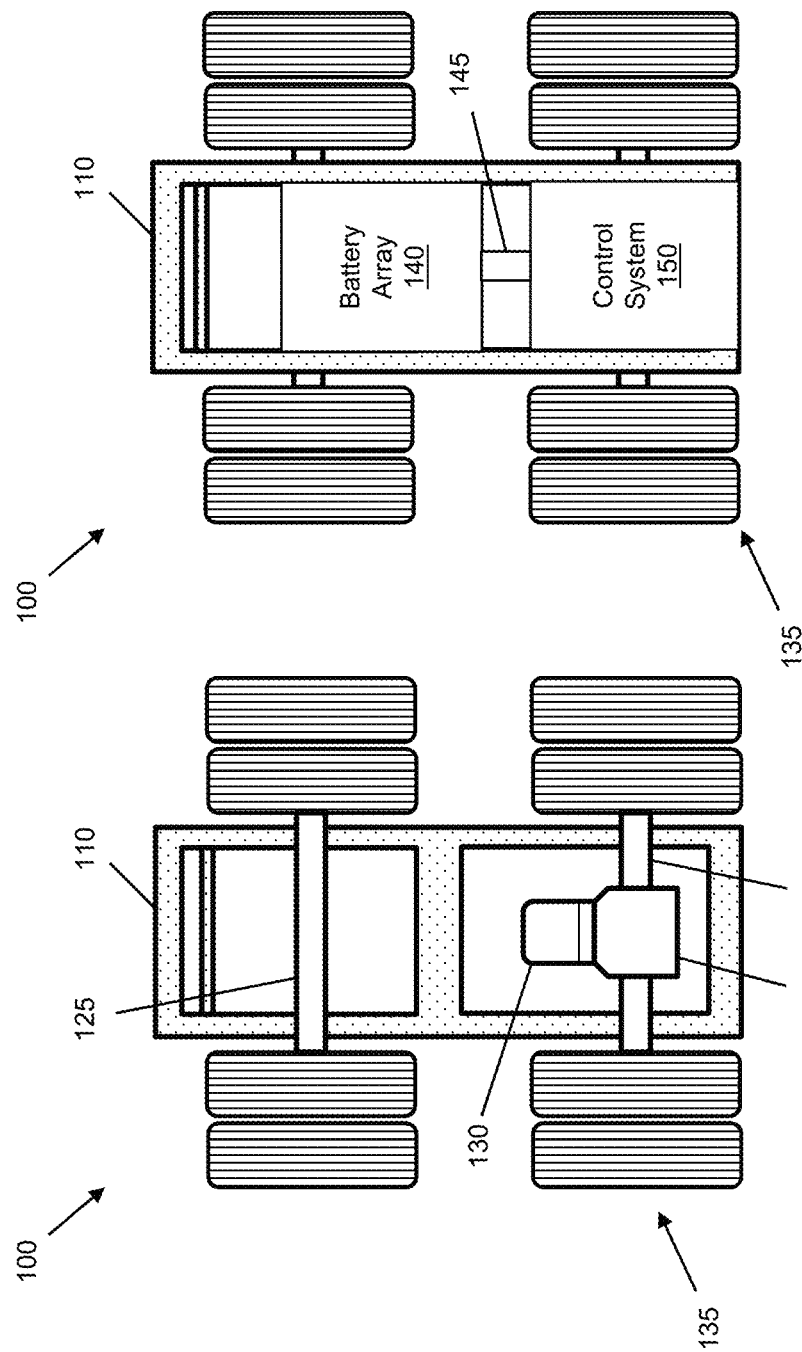

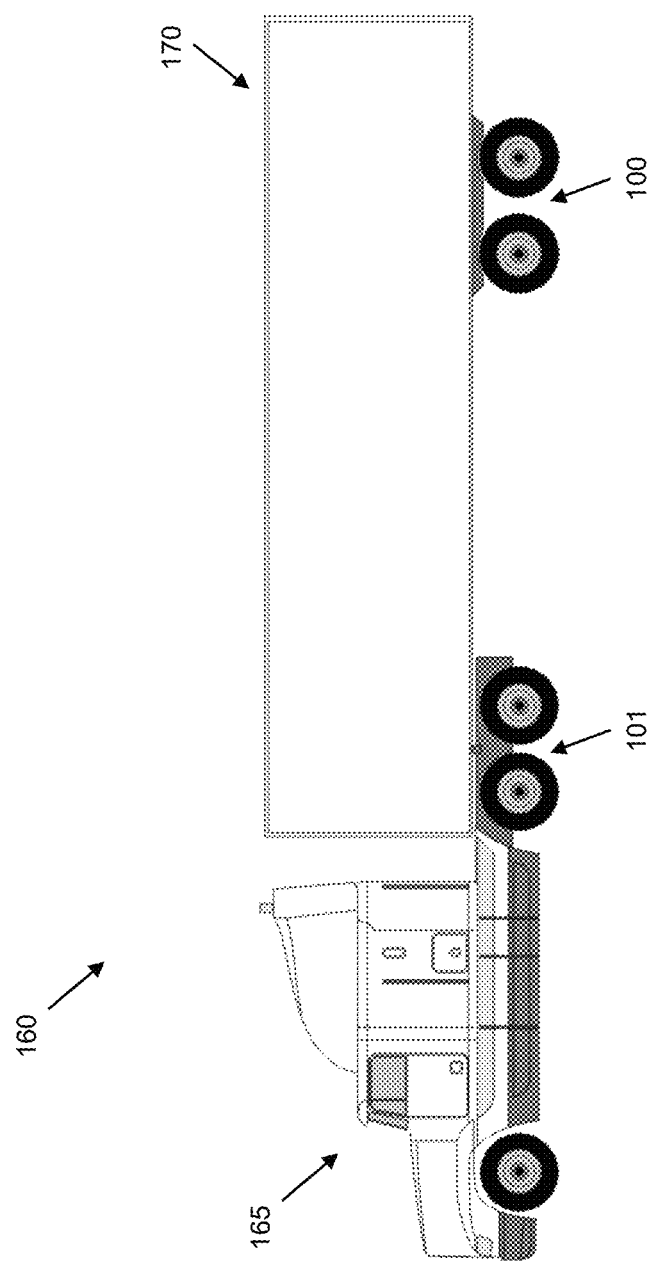

| SEVCON | | |
|---|---|---|
| IG POWER | 1 | OR |
| HV CONTACTOR OUT | 2 | GN |
| PRE-CHARGE RELAY | 3 | OR |
| | 4 | |
| | 5 | |
| | 6 | |
| RESOLVER EX- | 7 | BK |
| RESOLVER EX+ | 8 | GR |
| | 9 | |
| CAN GND | 10 | BK |
| CAN HI | 11 | YL |
| CAN HI | 12 | WH |
| LOGIC '0' | 13 | BK |
| PULSE DIG. OUT | 14 | YL |
| FWD SWITCH | 15 | BL |
| | 16 | |
| THROTTLE POT | 17 | WT |
| BRAKE POT | 18 | WT |
| SIN HI | 19 | GR |
| COS HI | 20 | GR |
| ENCODER -12V | 21 | BK |
| CAN LO | 22 | GR |
| CAN LO | 23 | BK |
| COIL SUPPLY | 24 | VT |
| FWD SWITCH (F) | 25 | BL |
| | 26 | |
| PULSE ENABLE IN | 27 | OR |
| MOTOR TEMP | 28 | VT |
| THROTTLE 5Vdc | 29 | RE |
| BRAKE 5Vdc | 30 | RE |
| SIN LO | 31 | BK |
| COS LO | 32 | BK |
| | 33 | |
| | 34 | |
| | 35 | |

FIG. 2A

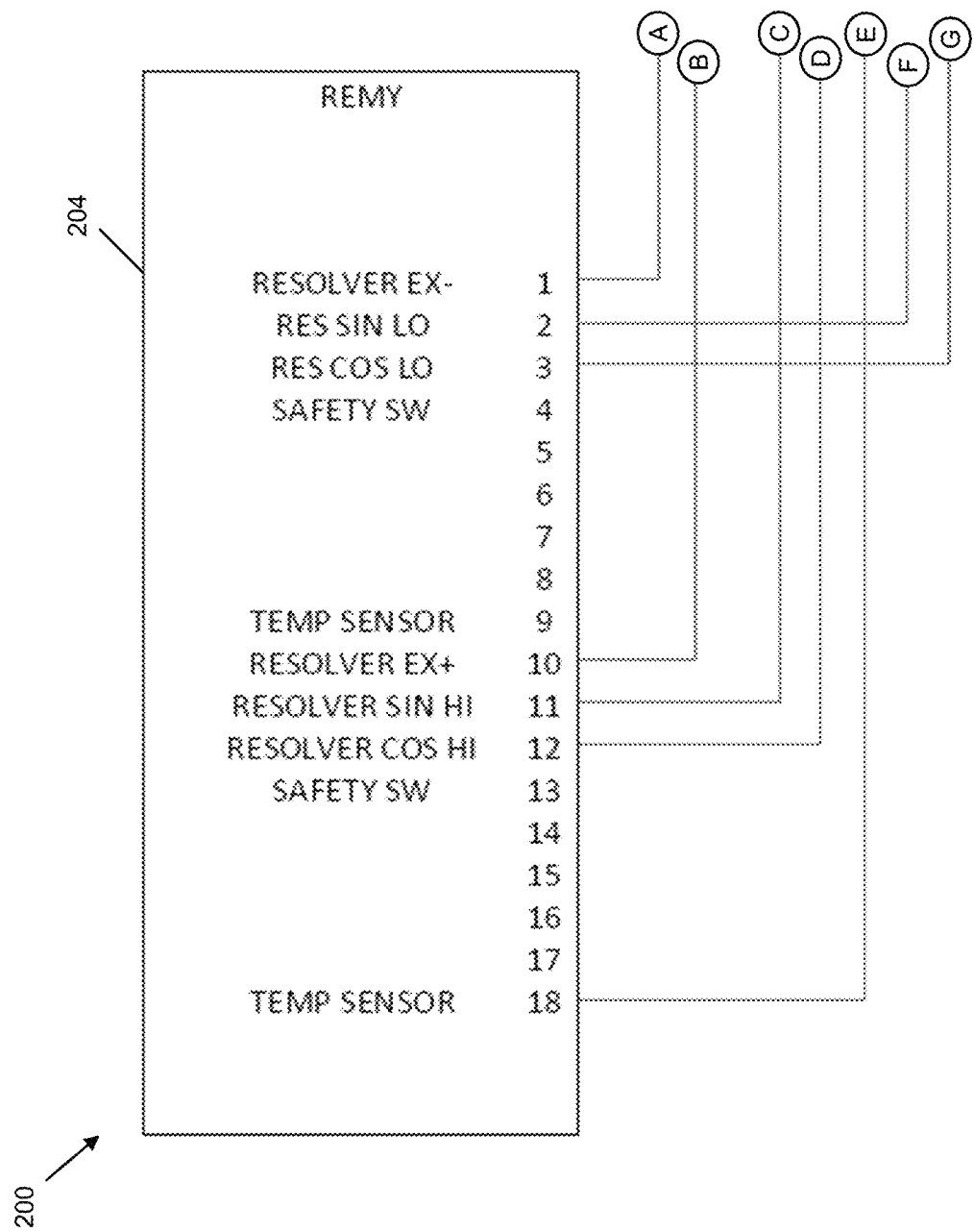

VEHICLE ENERGY MANAGEMENT SYSTEM AND RELATED METHODS

CROSS-REFERENCE TO RELATED APPLICATION(S)

This application claims benefit under 35 U.S.C. § 119(e) of U.S. Provisional Application Nos. 62/403,026, filed Sep. 30, 2016, and 62/460,734, filed Feb. 17, 2017, each of which is incorporated by reference herein.

BACKGROUND

Field of the Invention

The invention relates generally to hybrid vehicle technology, and in particular to systems and methods to intelligently control regeneration and reuse of captured energy in a through-the-road (TTR) hybrid configuration.

Description of the Related Art

The U.S. trucking industry consumes about 51 billion gallons of fuel per year, accounting for over 30% of overall industry operating costs. In addition, the trucking industry spends over $100 billion on fuel annually, and the average fuel economy of a tractor-trailer (e.g., an 18-wheeler) is only about 6.5 miles per gallon. For trucking fleets faced with large fuel costs, techniques for reducing those costs would be worth considering.

Hybrid technology has been in development for use in the trucking industry for some time, and some hybrid trucks have entered the market. However, existing systems are generally focused on hybridizing the drivetrain of a heavy truck or tractor unit, while any attached trailer or dead axles remain a passive load. Thus, the extent to which the fuel efficiency of a trucking fleet may be improved using these technologies may be limited to the fuel efficiencies obtained from improvement of the hybrid drivetrain and the in-fleet adoption of such hybrid drivetrain technologies. Given the large numbers of heavy trucks and tractor units already in service and their useful service lifetimes (often 10-20 years), the improved hybrid drivetrains that are candidates for introduction in new vehicles would only address a small fraction of existing fleets. Improved techniques, increased adoption and new functional capabilities are all desired.

SUMMARY

It has been discovered that a through the road (TTR) hybridization strategy can facilitate introduction of hybrid electric vehicle technology in a significant portion of current and expected trucking fleets. In some cases, the technologies can be retrofitted onto an existing vehicle (e.g., a truck, a tractor unit, a trailer, a tractor-trailer configuration, at a tandem, etc.). In some cases, the technologies can be built into new vehicles. In some cases, one vehicle may be built or retrofitted to operate in tandem with another and provide the hybridization benefits contemplated herein. By supplementing motive forces delivered through a primary drivetrain and fuel-fed engine with supplemental torque delivered at one or more electrically-powered drive axles, improvements in overall fuel efficiency and performance may be delivered, typically without significant redesign of existing components and systems that have been proven in the trucking industry.

In general, through-the-road (TTR) designs using control strategies such as an equivalent consumption minimization strategy (ECMS) or adaptive ECMS are contemplated and implemented at the supplemental torque delivering electrically-powered drive axle (or axles) in a manner that follows operational parameters or computationally estimates states of the primary drivetrain and/or fuel-fed engine, but does not itself participate in control of the fuel-fed engine or primary drivetrain. Instead, techniques of the present inventions rely on operating parameters that can be observed and/or kinematic variables that are sensed to inform its controller.

In some embodiments, an ECMS-type controller for electrically-powered drive axle is not directly responsive to driver-, autopilot- or cruise-type throttle controls of the fuel-fed engine or gear selections by a driver or autopilot in the primary drivetrain. Instead, the controller is responsive to sensed pressure in a brake line for regenerative braking and to computationally-estimated operational states of the fuel-fed engine or of the drive train. In some cases, observables employed by the controller include information retrievable via a CANbus or SAE J1939 vehicle bus interface such as commonly employed in heavy-duty trucks. While the ECMS-type controller employed for the electrically-powered drive axle (or axles) adapts to the particular characteristics and current operation of the fuel-fed engine and primary drivetrain (e.g., apparent throttle and gearing), it does not itself control the fuel-fed engine or of the primary drivetrain.

In some embodiments in accordance with the present invention(s), a vehicle includes a vehicle frame, an energy store on the vehicle, and a controller. The vehicle frame is configured for travel over a roadway under power of plural drive axles, wherein at least one of the plural drive axles is coupled via a primary drivetrain to a fuel-fed engine to drive at least a pair of wheels, and wherein at least one other of the plural drive axles is a first electrically-powered drive axle configured to supply supplemental torque to one or more additional wheels of the vehicle. The energy store is on the vehicle and is configured to supply the first electrically powered drive axle with electrical power in a first mode of operation and further configured to receive energy recovered using the first electrically powered drive axle in a second mode of operation. The controller is operatively coupled between the first electrically-powered drive axle and one or more sensor inputs, including at least a brake line sensor, to transition between the first, the second and at least a third mode of operation, wherein the controller is not coupled to control the fuel-fed engine or the primary drivetrain.

In some cases or embodiments, the controller is not directly responsive to controls of the fuel-fed engine and primary drivetrain, but instead computationally estimates operational states of the fuel-fed engine or primary drivetrain and supplies the supplemental torque in correspondence therewith. In some cases or embodiments, in the first mode of operation, the first electrically powered drive axle supplements primary motive forces applied through the primary drivetrain, and in the second mode of operation, the first electrically powered drive axle provides a regenerative braking force.

In some cases or embodiments, the vehicle includes a tractor unit for use in a tractor-trailer vehicle configuration, the vehicle frame is that of the tractor unit, and the primary drivetrain, the fuel-fed engine and the first electrically-powered drive axle are each fixed to the vehicle frame of the tractor unit. In some embodiments, the vehicle further includes a trailer, the trailer including at least a second electrically-powered drive axle controlled in the same manner as the first electrically-powered drive axle on the tractor unit.

In some cases or embodiments, the vehicle includes a trailer for use in a tractor-trailer vehicle configuration with a tractor unit. The vehicle frame is that of the trailer and the first electrically-powered drive axle is fixed thereto, and the primary drivetrain and the fuel-fed engine are those of the tractor unit. In some embodiments, the vehicle further includes the tractor unit, which in-turn includes a second electrically-powered drive axle controlled in the same manner as the first electrically-powered drive axle on the trailer.

In some cases or embodiments, the controller employs a parallel through the road equivalent consumption minimization strategy based on the computationally estimates of the operational states of the fuel-fed engine or primary drivetrain.

In some embodiments, the vehicle further includes a heating, ventilation or cooling (HVC) system, the heating, ventilation or cooling system coupled to receive electrical power from the energy store, wherein for stopover operation and without idling of the fuel-fed engine, the energy store powers the HVC system.

In some cases or embodiments, the tractor unit is a 6×2 tractor unit retrofitted to replace an otherwise dead axle of a tandem pair with the electrically-powered drive axle. In some cases or embodiments, the retrofitted electrically-powered drive axle is coupled to a brake line of the tractor unit for control of the regenerative braking mode of operation.

In some cases or embodiments, the energy store includes a battery; a battery management system for controllably maintaining a desired state of charge (SoC) of the energy store during the over-the-roadway travel; and a heat exchanger for at least moderating temperature of the battery during the over-the-roadway travel. In some cases or embodiments, the heat exchanger includes a fluid-air heat exchanger exposed to airflow during over-the-roadway travel and coupled into a compressor-based loop for subambient cooling of the battery at least during the over-the-roadway travel. The compressor-based loop is further coupled to supply subambient cooling to the cabin of the tractor unit, at least selectively during the stopover operation, via a fluid-air heat exchanger of the HVC system. In some cases or embodiments, the energy store further includes at least one additional electrical storage device having discharge rate and/or capacity characteristics that differ from the battery; and the battery management system controllably maintains the desired SoC including states of charge of the battery and of the at least one additional electrical storage device. In some cases or embodiments, the at least one additional electrical storage device includes either or both of an ultracapacitor and additional battery-type storage.

In some embodiments in accordance with the present inventions, a vehicle energy management method includes receiving, from one or more on-board sensors, trailer data including at least one of trailer position data, trailer weight data, trailer speed data, and trailer acceleration data for the trailer traveling along a given trajectory; computing (based at least in part on the received trailer data) a total estimated torque to maintain movement of the trailer along the given trajectory at a substantially constant speed; computationally estimating a torque applied by a powered vehicle at least partially towing the trailer; and applying (based on the computationally estimated torque applied by the powered vehicle and on the computed total estimated torque) a specified trailer torque to one or more trailer axles, wherein the specified trailer torque is provided by an electric motor-generator coupled to the one or more trailer axles.

In some cases or embodiments, the computing the total estimated torque includes computing one or more of a driver input torque, an air drag torque, a road drag torque, a road grade torque, an acceleration torque, and a braking torque. In some cases or embodiments, the computationally estimating the torque includes computationally estimating the torque based on one or more of driver behavior, road conditions, traffic conditions, weather conditions, and roadway grade.

In some embodiments, the energy management method further includes installing, underneath the trailer, a hybrid suspension system including the electric motor-generator coupled to the one or more trailer axles; and operating the hybrid suspension system in one of a power assist mode, a regeneration mode, and a passive mode of operation to provide the specified trailer torque. In some cases or embodiments, the electric motor-generator provides, in the power assist mode of operation, an assistive motive force. In some cases or embodiments, the electric motor-generator provides, in the regeneration mode of operation, a regenerative braking force. In some cases or embodiments, the electric motor-generator provides, in the passive mode of operation, neither an assistive motive force nor a regenerative braking force.

In some embodiments, the energy management further includes providing a battery array from which stored energy is supplied to the electric motor-generator in the power assist mode of operation and to which regenerated braking energy is supplied in the regeneration mode of operation. The specified trailer torque is selected so as to optimize energy usage of the battery array. In some cases or embodiments, the powered vehicle consumes fuel, and wherein the specified trailer torque is selected so as to simultaneously optimize fuel consumption of the powered vehicle and the energy usage of the battery array.

In some embodiments, the energy management method further includes determining a first plurality of torques that the powered vehicle is operable to provide; determining a second plurality of torques that the electric motor-generator is operable to provide; generating (based on the first plurality of torques) a first torque-to-fuel usage map for the powered vehicle; and generating (based on the second plurality of torques) a torque-to-energy usage map for the electric motor-generator.

In some embodiments, the energy management method further includes converting the torque-to-energy usage map into a second torque-to-fuel usage map; and computing a difference between the first and second torque-to-fuel usage maps, thereby providing a combined usage map. In some embodiments, the energy management method further includes determining, from the combined usage map, an index value corresponding to an optimal combined usage; and based on the index value, selecting the specified trailer torque. In some cases or embodiments, the specified trailer torque is selected, using the index value, from the torque-to-energy usage map.

In some embodiments, the energy management method further includes filtering (prior to computing the total estimated torque) the trailer data received from the one or more on-board sensors. In some cases or embodiments, the filtering is performed using at least one of a moving average and a Kalman filter.

In some embodiments in accordance with the present invention(s), a trailer for use in combination with a powered vehicle includes: one or more on-board sensors, a control system, and an electric motor-generator. The one or more on-board sensors are configured to detect trailer data including at least one of trailer position data, trailer weight data, trailer speed data, and trailer acceleration data for the trailer traveling along a given trajectory. The control system is operable to compute, based at least in part on the trailer data, a total estimated torque to maintain movement of the trailer along the given trajectory at a substantially constant speed. The electric motor-generator is coupled to one or more trailer axles, wherein the electric motor-generator is configured to provide a specified torque to the one or more trailer axles. The control system is further operable to computationally estimate a torque applied by the powered vehicle at least partially towing the trailer, and based on the computationally estimated torque applied by the powered vehicle and on the computed total estimated torque, to apply the specified trailer torque to the one or more trailer axles.

In some embodiments, the trailer further includes a hybrid suspension system including the electric motor-generator coupled to the one or more trailer axles, wherein the hybrid suspension system is installed underneath the trailer, wherein the hybrid suspension system is configured to operate in one of a power assist mode, a regeneration mode, and a passive mode of operation to provide the specified trailer torque. In some embodiments, the trailer further includes a battery array configured to supply stored energy to the electric motor-generator in the power assist mode of operation and configured to receive regenerated braking energy in the regeneration mode of operation, wherein the specified trailer torque is selectable by the control system so as to optimize energy usage of the battery array. In some cases or embodiments, the powered vehicle is configured to consume fuel, and wherein the specified trailer torque is selectable by the control system so as to simultaneously optimize fuel consumption of the powered vehicle and the energy usage of the battery array. In some cases or embodiments, the trailer is combined with the powered vehicle.

BRIEF DESCRIPTION OF THE DRAWINGS

The present invention is illustrated by way of example and not limitation with reference to the accompanying figures, in which like references generally indicate similar elements or features.

FIG. 1A depicts a bottom view of a hybrid suspension system, in accordance with some embodiments;

FIG. 1B depicts a top view of the hybrid suspension system, in accordance with some embodiments;

FIG. 1C depicts an exemplary tractor-trailer vehicle, including the hybrid suspension system and a further TTR hybrid system on a tractor unit, in accordance with some embodiments;

FIGS. 2A-2F illustrate a control system circuit, which may be housed within (or otherwise integrated with) the hybrid suspension system of FIGS. 1A and 1B or within (or integrated with) the on-tractor TTR hybrid system of FIGS. 1D-1G, in accordance with some embodiments;

Figures 1D, 1E:
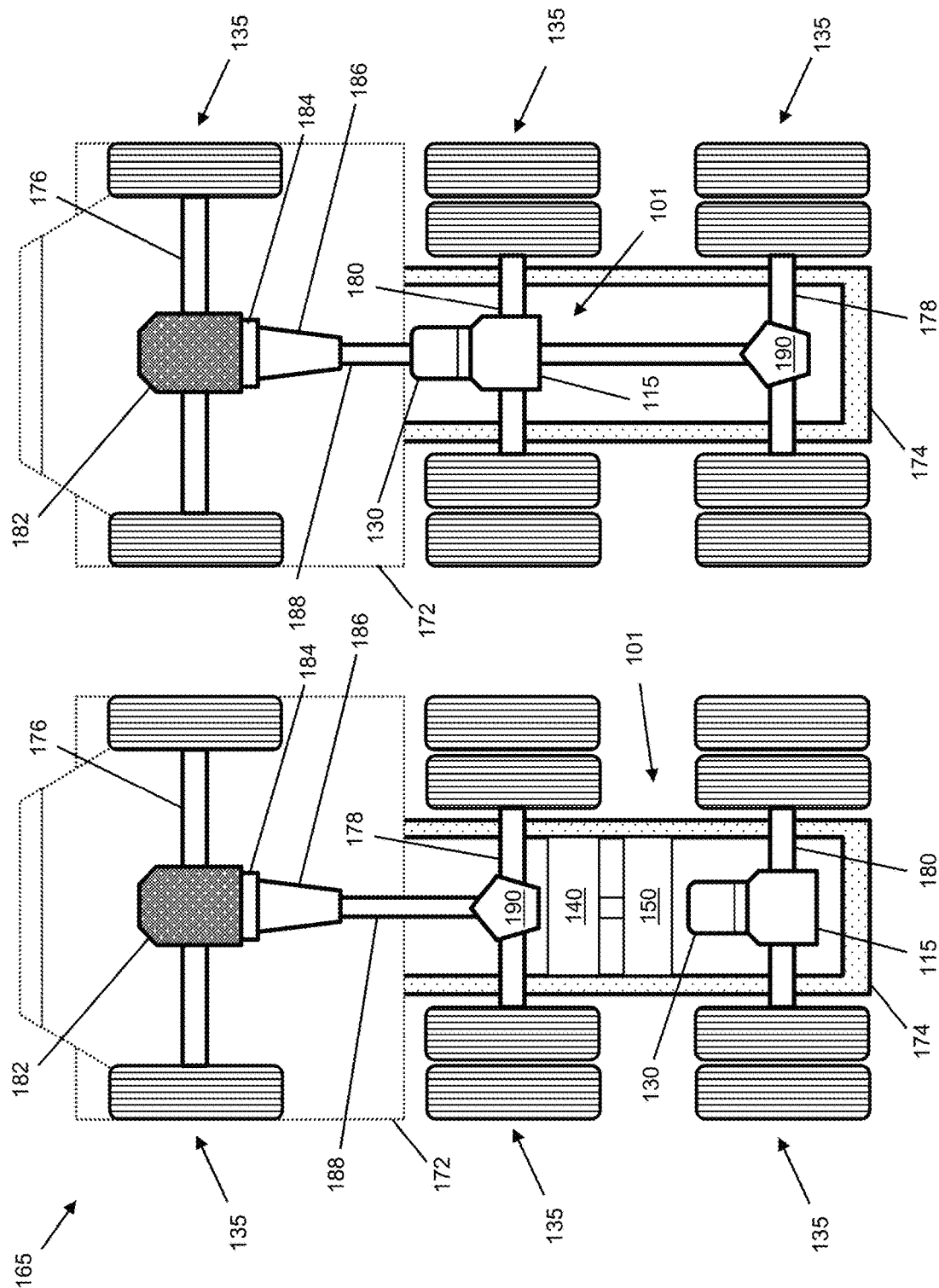
FIG. 1D depicts a bottom view of the on-tractor TTR hybrid system, in accordance with some embodiments.
FIG. 1E depicts a bottom view of an alternative embodiment of the on-tractor TTR hybrid system, in accordance with some embodiments.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of certain embodiments of the present invention(s).

DESCRIPTION

The present application describes a variety of embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 6A:
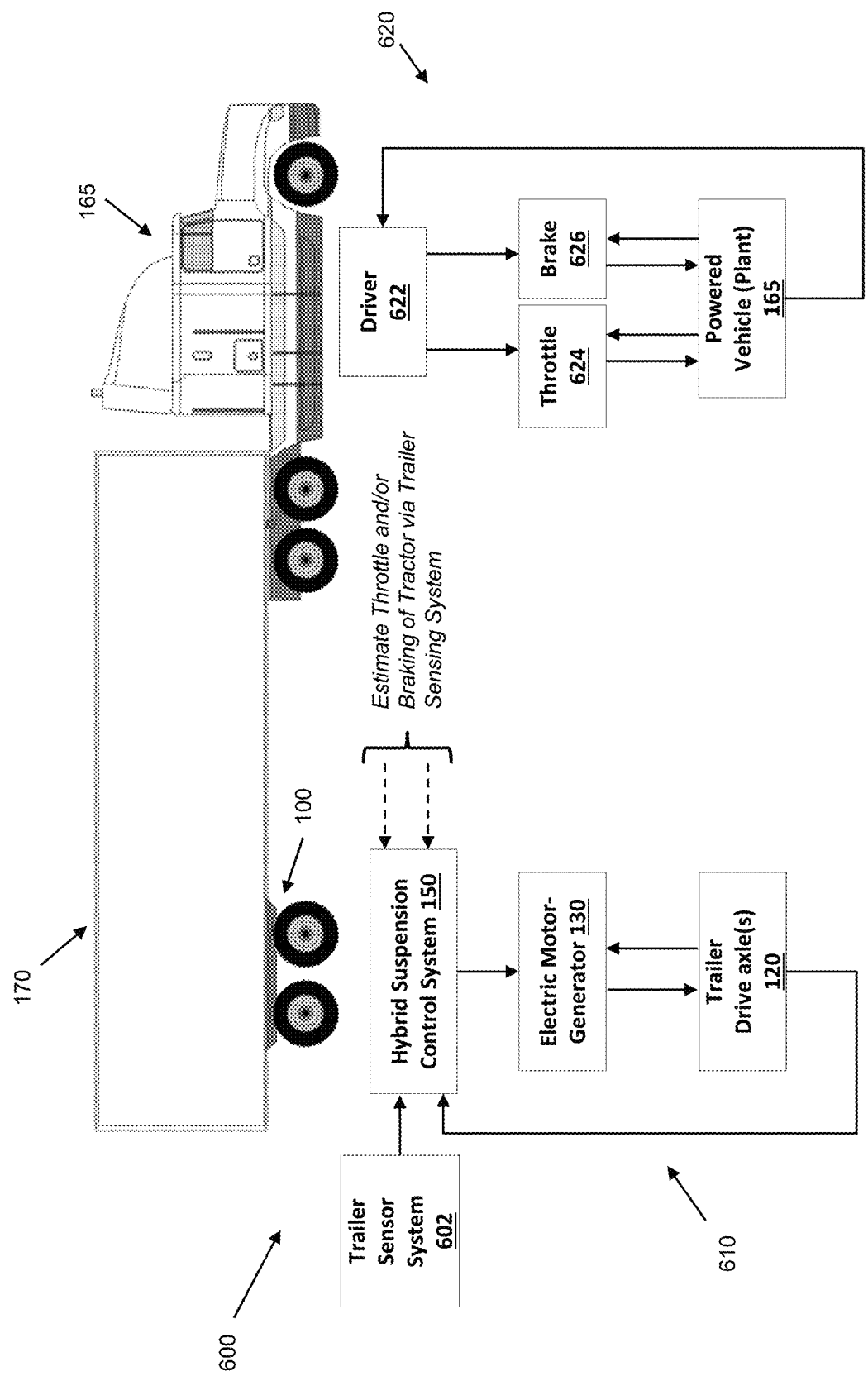
FIG. 6A is an exemplary functional block diagram illustrating control of an on-trailer hybrid suspension system, in accordance with some embodiments.
Figure 6B:
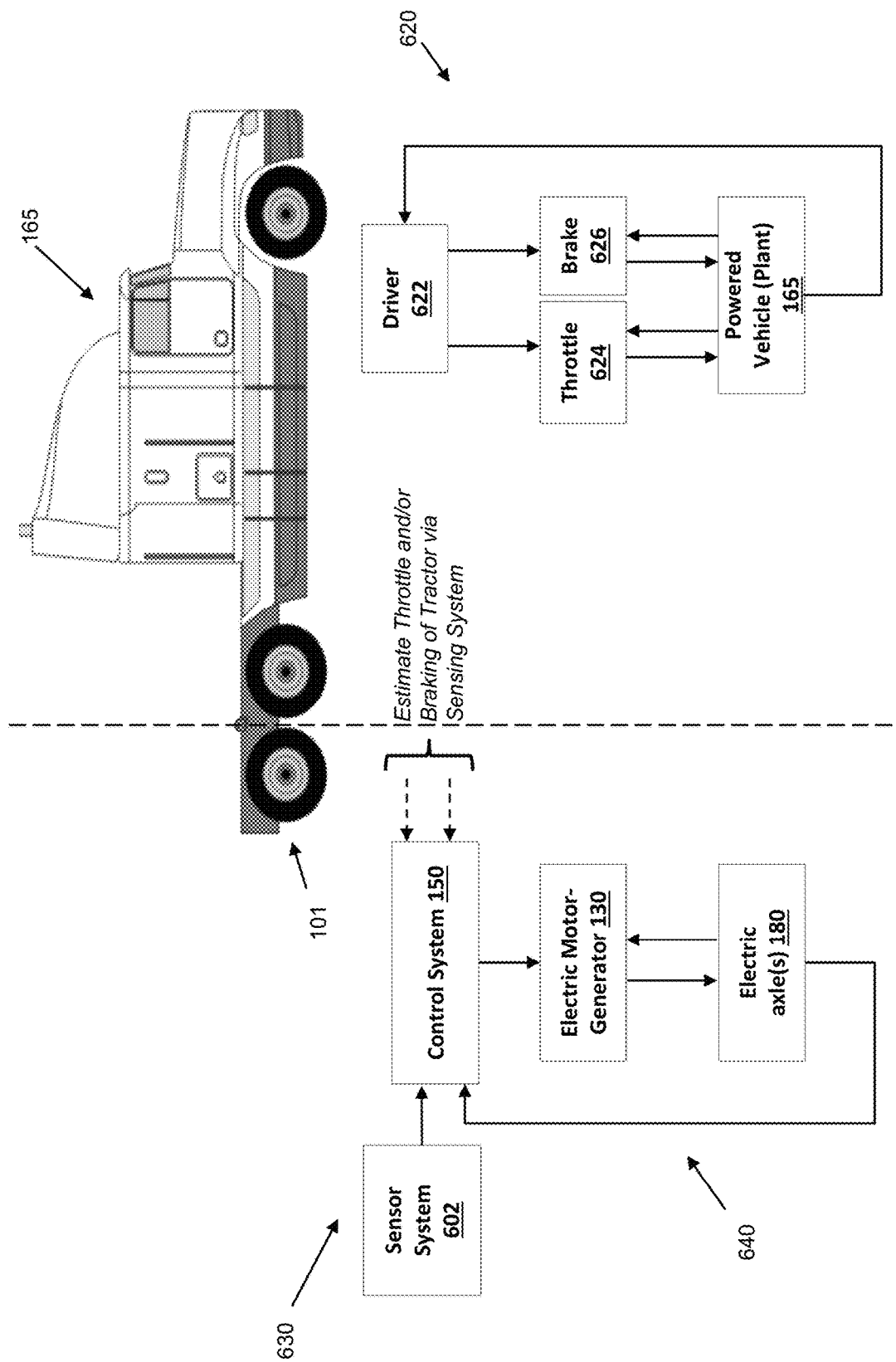
FIG. 6B is an exemplary functional block diagram illustrating control of an on-tractor TTR hybrid system, in accordance with some embodiments.
Figure 6C:
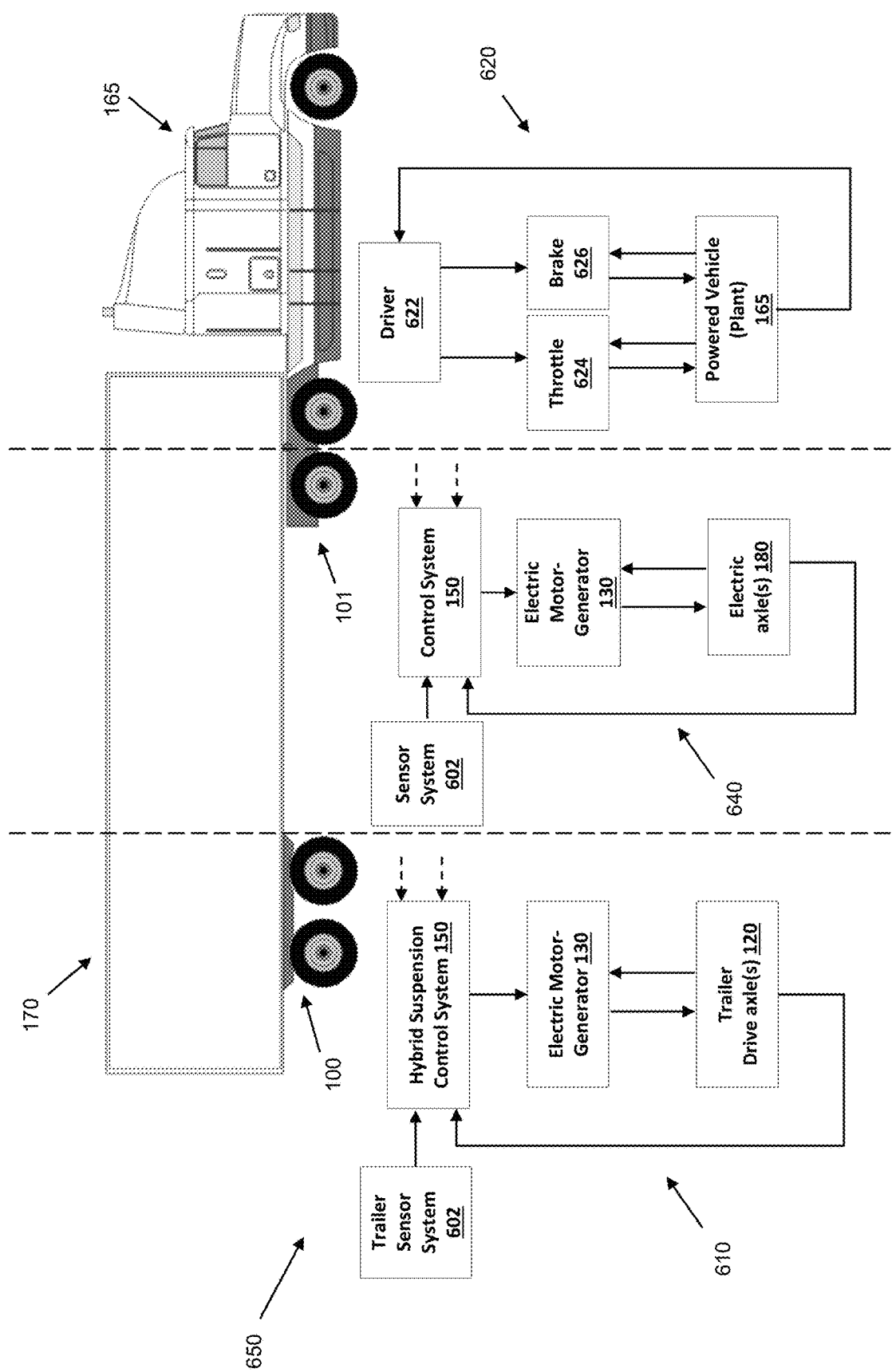
FIG. 6C is an exemplary functional block diagram illustrating control of both an on-trailer hybrid suspension system and an on-tractor TTR hybrid system, in accordance with some embodiments.

In particular, the present disclosure describes designs and techniques for providing an energy management system and related methods in the context of system and components typical in the heavy trucking industry. Some embodiments of the present invention(s) provide a hybridized suspension assembly (e.g., an electrically driven axle, power source, controller, etc. that may be integrated with suspension components) affixed (or suitable for affixing) underneath a vehicle (e.g., a truck, tractor unit, trailer, tractor-trailer or tandem configuration, etc.) as a replacement to a passive suspension assembly. In various non-limiting example configurations, a hybridized suspension assembly can be part of a trailer that may be towed by a powered vehicle, such as a fuel-consuming tractor unit. In additional non-limiting example configurations, a hybridized suspension assembly (or components thereof) may (alternatively or additionally) be included as part of a tractor unit or tandem. Configurations illustrated in FIGS. 6A, 6B and 6C are Illustrative, though not exhaustive.

As described in more detail below, a hybridized suspension assembly is but one realization in which an electrically driven axle operates largely independently of the fuel-fed engine and primary drivetrain of a powered vehicle and is configured to operate in a power assist, regeneration, and passive modes to supplement motive/braking forces and torques applied by the primary drivetrain and/or in braking. In general, one or more electrically driven axles may supplement motive/braking forces and torques under control of a controller (or controllers) that does not itself (or do not themselves) control fuel-fed engine and primary drivetrain. Instead, control strategy implemented by an electric drive controller seeks to follow and supplement the motive inputs of the fuel-fed engine and primary drivetrain using operating parameters that are observable (e.g., via CANbus or SAE J1939 type interfaces), kinematics that are sensed and/or states that may be computationally estimated based on either or both of the foregoing. In some embodiments, based on such observed, sensed or estimated parameters or states, the electric drive controller applies an equivalent consumption minimization strategy (ECMS) or adaptive ECMS type control strategy to modulate the motive force or torque provided, at the electrically driven axle(s), as a supplement to that independently applied using the fuel-fed engine and primary drivetrain of the powered vehicle.

By supplementing the fuel-fed engine and primary drivetrain of the powered vehicle, some embodiments of the present invention(s) seek to simultaneously optimize fuel consumption of the powered vehicle, energy consumption of the hybrid suspension assembly, and/or state of charge (SOC) of on-board batteries or other energy stores. In some cases, such as during stopovers, embodiments of the present disclosure allow the fuel-fed engine to shut down rather than idle. In some cases, energy consumption management strategies may take into account a desired SOC at scheduled, mandated or predicted stopovers. Among other advantages, embodiments disclosed herein provide for a significant reduction in fuel consumption (e.g., an average of about 30%), a built-in auxiliary power unit (APU), enhanced stability control, improved trailer dynamics, and a host of other benefits, at least some of which are described in more detail below.

Referring now to FIGS. 1A-1C, illustrated therein is a hybrid suspension system 100. As used herein, the term hybrid suspension system is meant to convey to a person of skill in the art having benefit of the present disclosure, a range of embodiments in which some or all components of a supplemental electrically driven axle, often (though not necessarily) including a controller, a power source, brake line sensors, CANbus or SAE J1939 type interfaces, sensor packages, off-vehicle radio frequency (RF) communications and/or geopositioning interfaces, etc. are packaged or integratable with components that mechanically interface one or more axles and wheels to the frame or structure of a vehicle and which typically operate (or interface with additional components) to absorb or dampen mechanical perturbuations and maintain tire contact with an roadway during travel thereover. In some though not all embodiments, a hybrid suspension system can take on the form or character of an assembly commonly referred to in the US trucking industry as a slider box. In some though not all embodiments, a hybrid suspension system may be or become more intregral with a vehicle frame and need not have the modular or fore/aft adjustability commonly associated with slider boxes.

Likewise, the "hybrid" or hybridizing character of a hybrid suspension system, such as hybrid suspension system 100, will be understood by persons of skill in the art having benefit of the present disclosure in the context of its role in hybridizing the sources of motive force or torque available in an over-the-road vehicle configuration that includes it. Accordingly, a hybrid suspension system including an electrically-driven axle and controller for coordinating its supplementation of motive force or torques need not, and typically does not itself include, the additional drive axles driven by fuel fed engine to which it contributes a hybrid or hybridizing source of motive force or torque. Thus, the tractor-trailer configuration (160) illustrated in FIG. 1C is exemplary and will be understood to include a hybrid suspension system, notwithstanding the ability of the trailer (170) to be decoupled from tractor units (e.g., tractor unit 165) that provide the fuel fed engine and primary drivetrain to which it acts as a supplement. Correspondingly, a vehicle such as a heavy truck having a single frame or operable as or with tandem trailers (not specifically shown in FIG. 1C) will be understood to be amenable to inclusion of one or more hybrid suspension systems.

Likewise, and with reference to FIG. 1C-1G, persons of skill in the art having benefit of the present disclosure will also appreciate exploitations of techniques of the present invention(s) in which an electrically-driven axle may be more closely integrated (whether by proximity or assembly) with a drive axle (or axles) driven by a fuel fed engine to which its hybrid or hybridizing source of motive force or torque acts as a supplement. In an effort to identify this form or arrangement, the term through-the-road (TTR) hybrid system is employed and meant to convey to a person of skill in the art having benefit of the present disclosure, a range of embodiments in which some or all components of a supplemental electrically driven axle, often (though not necessarily) including a controller, a power source, brake line sensors, CANbus or SAE J1939 type interfaces, sensor packages, off-vehicle radio frequency (RF) communications and/or geopositioning interfaces, etc. are arranged as a tandem or are integratable with components that are driven by the fuel fed engine and primary drivetrain to which the electrically driven axle acts as a supplement. The through-the-road (TTR) character is meant to emphasize that while electrically-driven and conventionally powered (e.g., by a fuel-fed engine and primary drivetrain) axles may be collocated, arranged as a tandem or otherwise integrated (or integratable) in assembly, they would not be understood by a person of skill in the art having benefit of the present disclosure to involve a combined drivetrain or transmission that blends the motive inputs of an electrical motor and a fuel-fed engine.

In some though not all embodiments, a TTR hybrid system can take on the form or character commonly understood with reference to a configuration referred to in the US trucking industry as a 6×2, but in which an otherwise dead axle is instead powered using an electrically-driven axle and controller for coordinating its supplementation of primary motive force or torques provided by a primary drivetrain and fuel-fed engine. Here too, the tractor-trailer configuration (160) illustrated in FIG. 1C is exemplary and will be understood to include a TTR hybrid system (101). Again, the tractor-trailer configuration (160) is exemplary, and notwithstanding the ability of the trailer (170) to be decoupled from tractor units (e.g., tractor unit 165) that provide a TTR hybrid system, vehicles such as a heavy truck having a single frame or operable as or with tandem trailers (not specifically shown in FIG. 1C) will be understood to be amenable to inclusion of a TTR hybrid system. Although the through-the-road character is emphasized for TTR hybrid systems such as illustrated on described with reference to FIGS. 1D-1G, persons of skill in the art having benefit of the present disclosure will appreciate that systems illustrated and described using hybrid suspension system terminology likewise operate using a through-the-road (TTR) hybridization strategy.

In view of the foregoing, and without limitation, hybrid suspension system-type and TTR hybrid system-type embodiments are now described with respect to specific examples.

Hybrid Suspension System

As described in more detail below, the hybrid suspension system 100 may include a frame 110, a suspension, one or more drive axles (e.g., such as a drive axle 120), at least one electric motor-generator (e.g., such as an electric-motor generator 130) coupled to the at least one or more drive axles, an energy storage system (e.g., such as a battery array 140), and a controller (e.g., such as a control system 150). In accordance with at least some embodiments, the hybrid suspension system 100 is configured for attachment beneath a trailer. As used herein, the term "trailer" is used to refer to an unpowered vehicle towed by a powered vehicle. In some cases, the trailer may include a semi-trailer coupled to and towed by a truck or tractor (e.g., a powered towing vehicle). By way of example, FIG. 1C illustrates a tractor-trailer vehicle 160 that includes a tractor 165 coupled to and operable to tow a trailer 170. In particular, and in accordance with embodiments of the present disclosure, the hybrid suspension system 100 is coupled underneath the trailer 170, as a replacement to a passive suspension assembly, as discussed in more detail below. For purposes of this discussion, the tractor 165 may be referred to generally as a "powered towing vehicle" or simply as a "powered vehicle".

To be sure, embodiments of the present disclosure may equally be applied to other types of trailers (e.g., utility trailer, boat trailer, travel trailer, livestock trailer, bicycle trailer, motorcycle trailer, a gooseneck trailer, flat trailer, tank trailer, farm trailer, or other type of unpowered trailer) towed by other types of powered towing vehicles (e.g., pickup trucks, automobiles, motorcycles, bicycles, buses, or other type of powered vehicle), without departing from the scope of this disclosure. Likewise, although components are introduced and described in the context of an exemplary suspension assembly for a trailer, persons of skill in the art having benefit of the present disclosure will appreciate adaptations of configurations and components introduced in the exemplary trailer context to supplemental electrically driven axle applications such as affixed (or suitable for affixing) underneath a vehicle (e.g., a truck, tractor unit, trailer, tractor-trailer or tandem configuration, etc.).

Vehicles may utilize a variety of technologies and fuel types such as diesel, gasoline, propane, biodiesel, ethanol (E85), compressed natural gas (CNG), hydrogen internal combustion engine (ICE), homogeneous charge compression ignition (HCCI) engine, hydrogen fuel cell, hybrid electric, plug-in hybrid, battery electric, and/or other type of fuel/technology. Regardless of the type of technology and/or fuel type, the powered towing vehicle (or more generally the fuel-fed engine of a powered vehicle) may have a particular fuel efficiency. As described below, and among other advantages, embodiments of the present disclosure provide for improved fuel efficiency of the powered vehicle, as described in more detail herein. More generally, and in accordance with various embodiments, the hybrid suspension system 100 described herein is configured (or may be adapted) for use with any type of trailer or powered vehicle.

In addition, the hybrid suspension system 100 is configured to operate largely independently of the fuel-fed engine and primary drivetrain of a powered vehicle and, in some cases, autonomously from the engine and drivetrain controls of the powered vehicle. As used herein, "autonomous" operation of the hybrid suspension system 100 is terminology used to describe an ability of the hybrid suspension system 100 to operate without commands or signals from the powered towing vehicle, to independently gain information about itself and the environment, and to make decisions and/or perform various functions based on one or more algorithms stored in the controller, as described in more detail below. "Autonomous" operation does not preclude observation or estimation of certain parameters or states of a powered vehicle's fuel-fed engine or primary drivetrain; however, in some embodiments of the present invention(s), electrically driven axles are not directly controlled by an engine control module (ECM) of the powered vehicle and, even where ECMS or adaptive ECMS-type control strategies are employed, no single controller manages control inputs to both the supplemental electrically driven axle(s) and the primary fuel-fed engine and drivetrain.

A trailer, as typically an unpowered vehicle, includes one or more passive axles. By way of example, embodiments of the present disclosure provide for replacement of the one or more passive trailer axles with one or more powered axles. For example, in at least some embodiments, the hybrid suspension system 100 may replace a passive tandem axle with a powered tandem axle, as shown in the example of FIG. 1C. In accordance with some embodiments of the present invention(s), the hybrid suspension system 100 can be configured to provide, in a first mode of operation, a motive rotational force (e.g., by an electric motor-generator coupled to a drive axle) to propel the hybrid suspension system 100, and thus the trailer under which is attached, thereby providing an assistive motive force to the powered towing vehicle. Thus, in some examples, the first mode of operation may be referred to as a "power assist mode." Additionally, in some embodiments, the hybrid suspension system 100 is configured to provide, in a second mode of operation, a regenerative braking force (e.g., by the electric motor-generator coupled to the drive axle) that charges an energy storage system (e.g., the battery array). Thus, in some examples, the second mode of operation may be referred to as a "regeneration mode." In some examples, the hybrid suspension system 100 is further configured to provide, in a third mode of operation, neither motive rotational nor regenerative braking force such that the trailer and the attached hybrid suspension system 100 are solely propelled by the powered towing vehicle to which the trailer is coupled. Thus, in some examples, the third mode of operation may be referred to as a "passive mode."

In providing powered axle(s) to the trailer (e.g., by the hybrid suspension system 100), embodiments of the present disclosure result in a significant reduction in both fuel consumption and any associated vehicle emissions, and thus a concurrent improvement in fuel efficiency, of the powered towing vehicle. In addition, various embodiments may provide for improved vehicle acceleration, vehicle stability, and energy recapture (e.g., via regenerative braking) that may be used for a variety of different purposes. For example, embodiments disclosed herein may use the recaptured energy to apply the motive rotational force using the electric motor-generator and/or provide on-trailer power that may be used for powering a lift gate, a refrigeration unit, a heating ventilation and air conditioning (HVAC) system, pumps, lighting, communications systems, and/or providing an auxiliary power unit (APU), among others. It is noted that the above advantages and applications are merely exemplary, and additional advantages and applications will become apparent to those skilled in the art upon review of this disclosure.

Referring again to FIG. 1A, illustrated therein is a bottom view of an exemplary hybrid suspension system 100 which shows the frame 110, the drive axle 120, a passive axle 125, and wheels/tires 135 coupled to ends of each of the drive axle 120 and the passive axle 125. In some embodiments, the electric motor-generator 130 is coupled to the drive axle 120 by way of a differential 115, thereby allowing the electric motor generator 130 to provide the motive rotational force in the first mode of operation, and to charge the energy storage system (e.g., the battery array) by regenerative braking in the second mode of operation. Note that in some embodiments, components such as the electric motor generator, gearing and any differential may be more or less integrally defined, e.g., within a single assembly or as a collection of mechanically coupled components, to provide an electrically-driven axle. While shown as having one drive axle and one passive axle, in some embodiments, the hybrid suspension system 100 may have any number of axles, two or more drive axles, as well as multiple electric-motor generators on each drive axle. In addition, axles of the hybrid suspension system (e.g., the drive axle 120 and the passive axle 125) may be coupled to the frame 110 by a leaf spring suspension, an air suspension, a fixed suspension, a sliding suspension, or other appropriate suspension. In some embodiments, the wheels/tires 135 coupled to ends of one or both of the drive axle 120 and the passive axle 125 may be further coupled to a steering system (e.g., such as a manual or power steering system), thereby providing for steering of the hybrid suspension system 100 in a desired direction.

With reference to FIG. 1B, illustrated therein is a top view of the hybrid suspension system 100 showing the battery array 140 and the control system 150. In various embodiments, the battery array 140 and the control system 150 may be coupled to each other by an electrical coupling 145. In addition, the electric motor-generator 130 may be coupled to the control system 150 and to the battery array 140, thereby providing for energy transfer between the battery array 140 and the electric motor-generator 130. In various examples, the battery array 140 may include one or more of an energy dense battery and a power dense battery. For example, in some embodiments, the battery array 140 may include one or more of a nickel metal hydride (NiMH) battery, a lithium ion (Li-ion) battery, a lithium titanium oxide (LTO) battery, a nickel manganese cobalt (NMC) battery, a supercapacitor, a lead-acid battery, or other type of energy dense and/or power dense battery.

TTR Hybrid System

In some embodiments, one or more aspects of the supplemental hybridizing system explained above with respect to hybrid suspension system 100 may be adapted for use as part of the tractor 165. With reference to FIG. 1C, and in some embodiments, such an adapted through the road (TTR) hybrid system 101 may include various aspects of the hybrid suspension system 100, as described above, which are coupled to and/or integrated with existing components of the tractor 165 to provide the TTR hybrid system 101. In some examples, the TTR hybrid system 101 may provide for replacement of the one or more passive axles of the tractor 165 with one or more powered axles. Thus, in various embodiments, the TTR hybrid system 101 may be used to provide a motive rotational force (e.g., in a first mode, or power assist mode, of operation) to the powered towing vehicle (e.g., to the tractor 165). Additionally, in some embodiments, the TTR hybrid system 101 is configured to provide a regenerative braking force (e.g., in a second mode, or regeneration mode, of operation) that charges an energy storage system (e.g., the battery array). In some examples, the TTR hybrid system 101 is further configured to provide neither motive rotational nor regenerative braking force (e.g., in a third mode, or passive mode, of operation).

It is noted that the TTR hybrid system 101 may be used separately and independently from the hybrid suspension system 100 attached to the trailer. Thus, for example, advantages of the various embodiments disclosed herein (e.g., reduced fuel consumption and emissions, improved fuel efficiency, vehicle acceleration, vehicle stability, and energy recapture) may be realized by the TTR hybrid system 101 apart from the hybrid suspension system 100. This may be advantageous, for instance, when the tractor 165 is driven without the attached trailer. To be sure, when the tractor 165 is used to tow a trailer and in some embodiments, the hybrid suspension system 100 and the TTR hybrid system 101 may be cooperatively operated to provide a greater motive rotational force to, or recapture a greater amount of energy from, the tractor-trailer vehicle 160 than either of the hybrid suspension system 100 or the TTR hybrid system 101 may be able to provide or recapture on their own. In at least some embodiments, the TTR hybrid system 101 may be independently used (e.g., apart from the hybrid suspension system 100) to recapture energy that can subsequently be used to provide power to tractor 165 systems and/or to trailer systems. For example, such power may be used to power a lift gate, a refrigeration unit, a heating ventilation and air conditioning (HVAC) system, pumps, lighting, communications systems, and/or to provide an auxiliary power unit (APU), among others.

With reference to FIG. 1D, illustrated therein is a bottom view of the TTR hybrid system 101 coupled to and/or integrated with the tractor 165. As shown, the tractor 165 may include a cab 172, a frame 174, a steering axle 176, an engine-powered axle 178, an electric axle 180, and wheels/tires 135 coupled to ends of each of the steering axle 176, the engine-powered axle 178, and the electric axle 180. A steering wheel may be coupled to the steering axle 176 to turn and/or otherwise control a direction of travel of the tractor 165. In various embodiments, the tractor 165 further includes an engine 182, a torque converter 184 coupled to the engine 182, a transmission 186 coupled to the torque converter 184, a drive shaft 188 coupled to the transmission 186, and a differential 190 coupled to the drive shaft 188. The differential 190 may be further coupled to the engine-powered axle 178, thereby providing torque to the wheels coupled to ends of the engine-powered axle 178. As part of the TTR hybrid system 101, and in various embodiments, the electric motor-generator 130 may be coupled to the electric axle 180 by way of the differential 115, thereby allowing the electric motor-generator 130 to provide the motive rotational force in the first mode of operation, and to charge the energy storage system (e.g., the battery array) by regenerative braking in the second mode of operation. In some embodiments, the electric axle 180 may include multiple electric-motor generators coupled thereto. As shown in FIG. 1D, the TTR hybrid system 101 may also include the battery array 140 and the control system 150, for example, coupled to each other by an electrical coupling, thereby providing for energy transfer between the battery array 140 and the electric motor-generator 130. The battery array 140 may include any of a variety of battery types, as described above.

Referring to FIG. 1E, illustrated therein is a bottom view of an alternative embodiment of the TTR hybrid system 101 coupled to and/or integrated with the tractor 165. In particular, in the example of FIG. 1D, the engine-powered axle 178 is disposed between the steering axle 176 and the electric axle 180, which is disposed at a back end (e.g., opposite the cab 172) of the tractor 165. Alternatively, in the example of FIG. 1E, the electric axle 180 is disposed between the steering axle 176 and the engine-powered axle 178, which is disposed at a back end (e.g., opposite the cab 172) of the tractor 165. While not shown in FIG. 1E for clarity of illustration, the TTR hybrid system 101 provided therein may also include the battery array 140 and the control system 150, as described above.

Figure 1F:
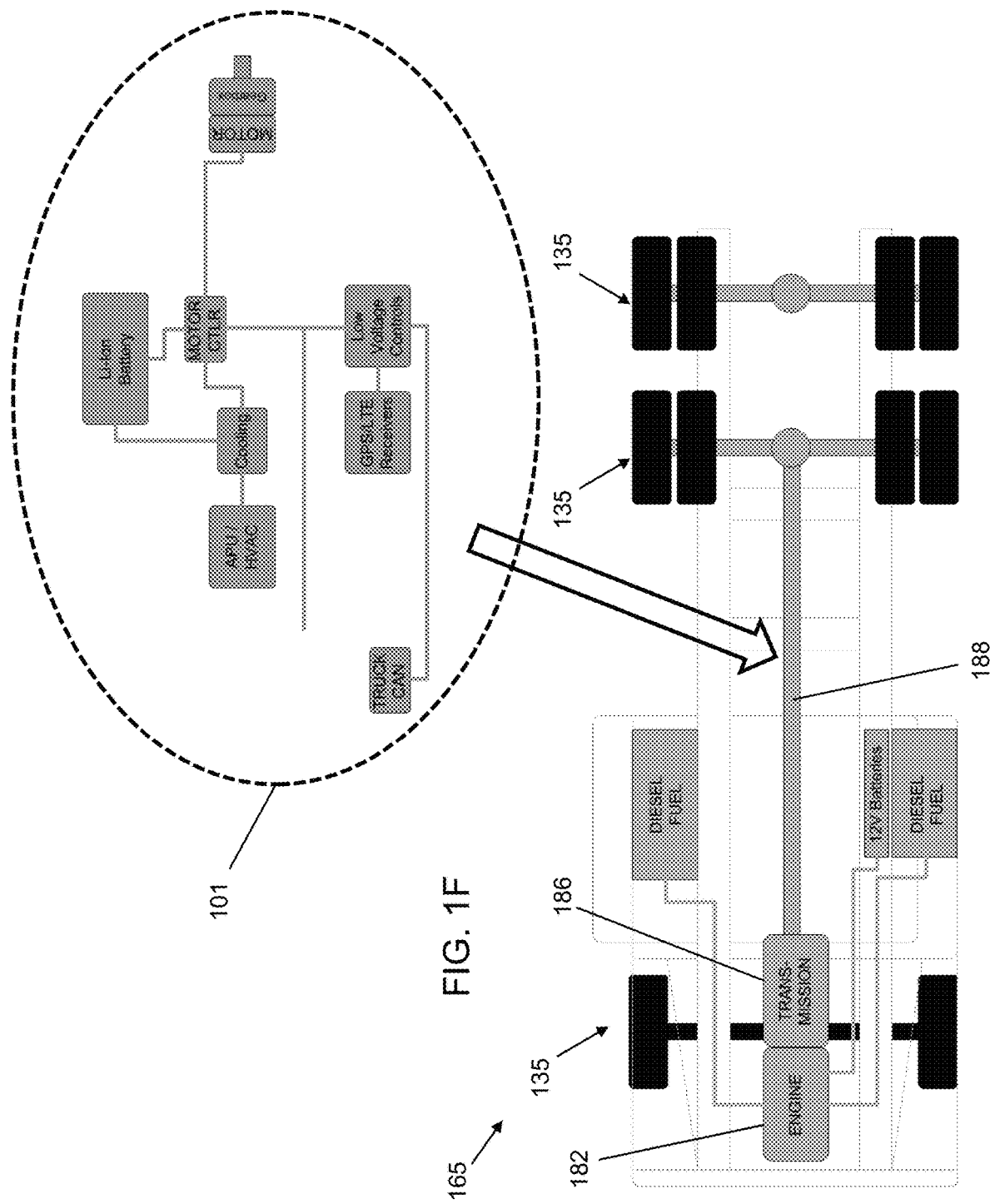
FIG. 1F depicts a view of an alternative embodiment of the on-tractor TTR hybrid system of FIG. 1D, prior to installation of the TTR hybrid system on the tractor, in accordance with some embodiments.
Figure 1G:
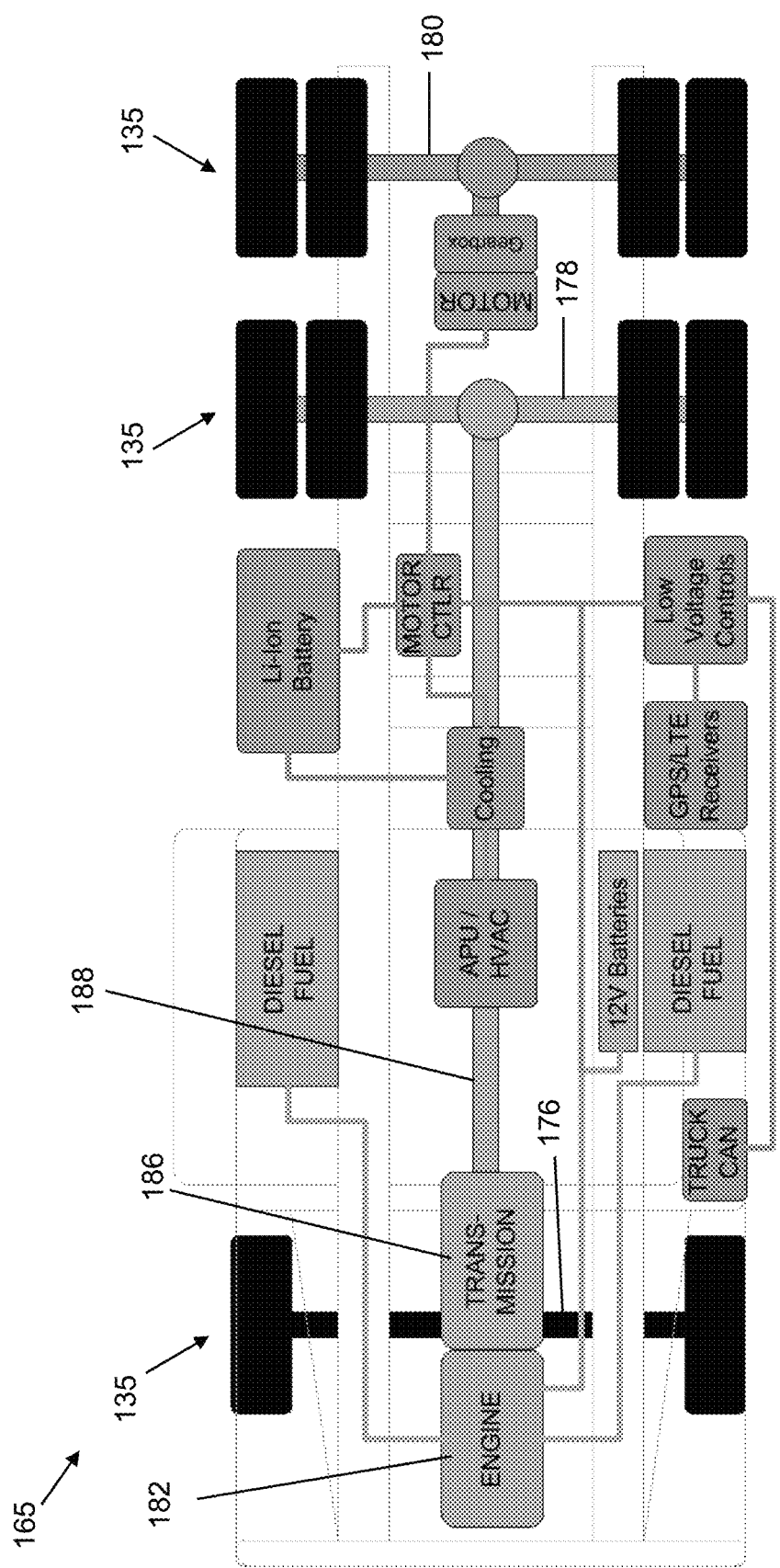
FIG. 1G depicts a view of an alternative embodiment of the on-tractor TTR hybrid system of FIG. 1D, after installation of the TTR hybrid system on the tractor, in accordance with some embodiments.

Referring to FIG. 1F, illustrated therein is a view of an alternative embodiment of the on-tractor TTR hybrid system 101, prior to installation of the TTR hybrid system 101 on the tractor 165. As shown in FIG. 1F, the TTR hybrid system 101 may include a battery, a motor controller, a cooling system, an APU, low voltage controls, GPS/LTE receivers, a motor and gearbox, and a truck CAN bus interface. Referring to FIG. 1G, illustrated therein is a view of an alternative embodiment of the on-tractor TTR hybrid system 101, after installation of the TTR hybrid system 101 on the tractor 165. In some aspects, the example of FIG. 1G is similar to the example of FIG. 1D, at least inasmuch as the engine-powered axle 178 is disposed between the steering axle 176 and the electric axle 180, which is disposed at a back end (e.g., opposite the cab 172) of the tractor 165. While not explicitly shown, the TTR hybrid system 101 of FIGS. 1F and 1G may further include other features described herein such as additional controllers, brake line sensors, SAE J1939 type interfaces, sensor packages, off-vehicle radio frequency (RF) communications, etc. In addition, and in some embodiments, various features of the TTR hybrid system 101, as illustrated in FIGS. 1F and 1G, may be equally installed and used in a TTR hybrid system 101 as shown in FIGS. 1C and 1E, and/or within a hybrid suspension system as shown in FIGS. 1A-1C.

Although TTR hybrid system configurations are described in the context of a tractor unit suitable for use in a tractor-trailer configuration, persons of skill in the art having benefit of the present disclosure will appreciate configurations in which powered vehicles, including heavy trucks with a single effective frame, include the systems methods and/or techniques disclosed herein relative to tractor unit, trailer, tractor-trailer and/or tandem configurations.

Control System Architecture and Components

As discussed above, the hybrid suspension system 100 and/or the TTR hybrid system 101 are configured to operate autonomously and in at least three modes of operation: (i) a power assist mode, (ii) a regeneration mode, and (iii) a passive mode. In particular, and in various embodiments, the hybrid suspension system 100 and/or the TTR hybrid system 101 are operated in one of these three modes by way of the control system 150 (e.g., in conjunction with suitable program code, as discussed below). Various aspects of the control system 150, including system architecture and exemplary components, are described in more detail below with reference to FIGS. 2A-2F, 3, and 4.

Figure 2C:
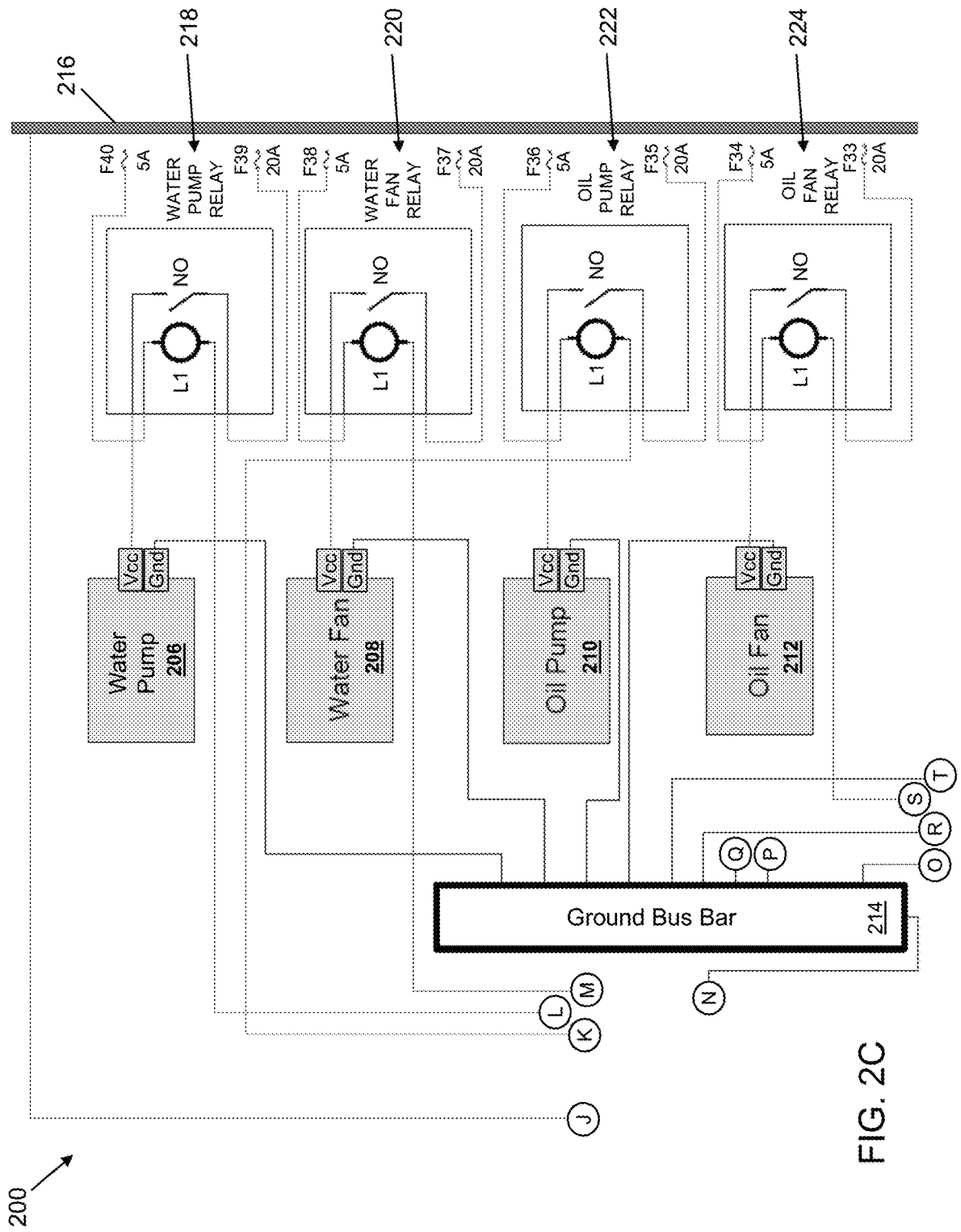
Figure 2D:
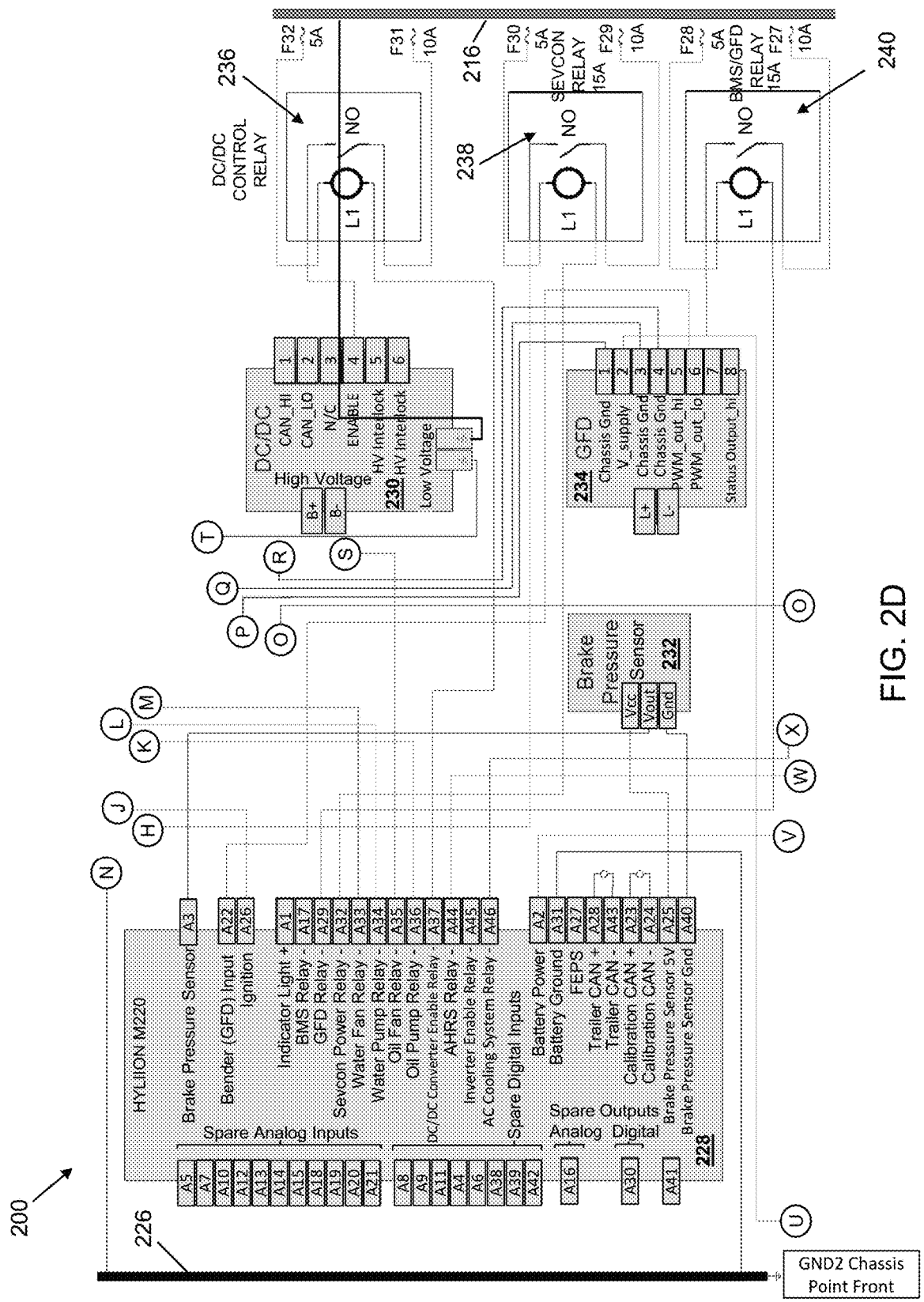

Referring first to FIGS. 2A-2F, illustrated therein is a control system circuit 200 that may be housed within the control system 150. It is noted that the control system circuit 200, and the components shown and described herein are merely exemplary, and other components and/or circuit architecture may be used without departing from the scope of the this disclosure. FIG. 2A shows an AC motor controller 202, which may be used to actuate the electric motor-generator 130. By way of example, and in some cases, the AC motor controller 202 may include a Gen4 Size 8 controller manufactured by Sevcon USA, Inc. of Southborough, Mass. In some embodiments, the AC motor controller 202 is coupled to an AC motor controller relay 238 (FIG. 2D). As described below with reference to FIG. 3, the AC motor controller 202 may communicate with other components of the control system circuit 200 by way of a controller area network (CAN bus). In some embodiments, a CANbus or SAE J1939 interface may be provided to other systems. FIG. 2B shows an electric motor-generator 204, which may be the electric motor-generator 130 discussed above, and which may be actuated by the AC motor controller 202. In some examples, the electric-motor generator 204 may include an electric motor-generator manufactured by Remy International, Inc. of Pendleton, Ind. FIG. 2C illustrates a water pump 206 coupled to a water pump relay 218, a water fan 208 coupled to a wafer fan relay 220, an oil pump 210 coupled to an oil pump relay 222, an oil fan 212 coupled to an oil fan relay 224, and a ground bus bar 214. Each of the water pump 206, the water fan 208, the oil pump 210, and the oil fan 212 may be coupled to a voltage supply 216 (and thus enabled) by way of their respective relay, where the relays are coupled to and actuated by a master control unit 228 (FIG. 2D). In addition, the ground bus bar 214 may be coupled to a ground plane 226 (FIG. 2D), and each of the water pump 206, the water fan 208, the oil pump 210, and the oil fan 212 may be coupled to the ground plane 226 by way of the ground bus bar 214.

Figure 2E:
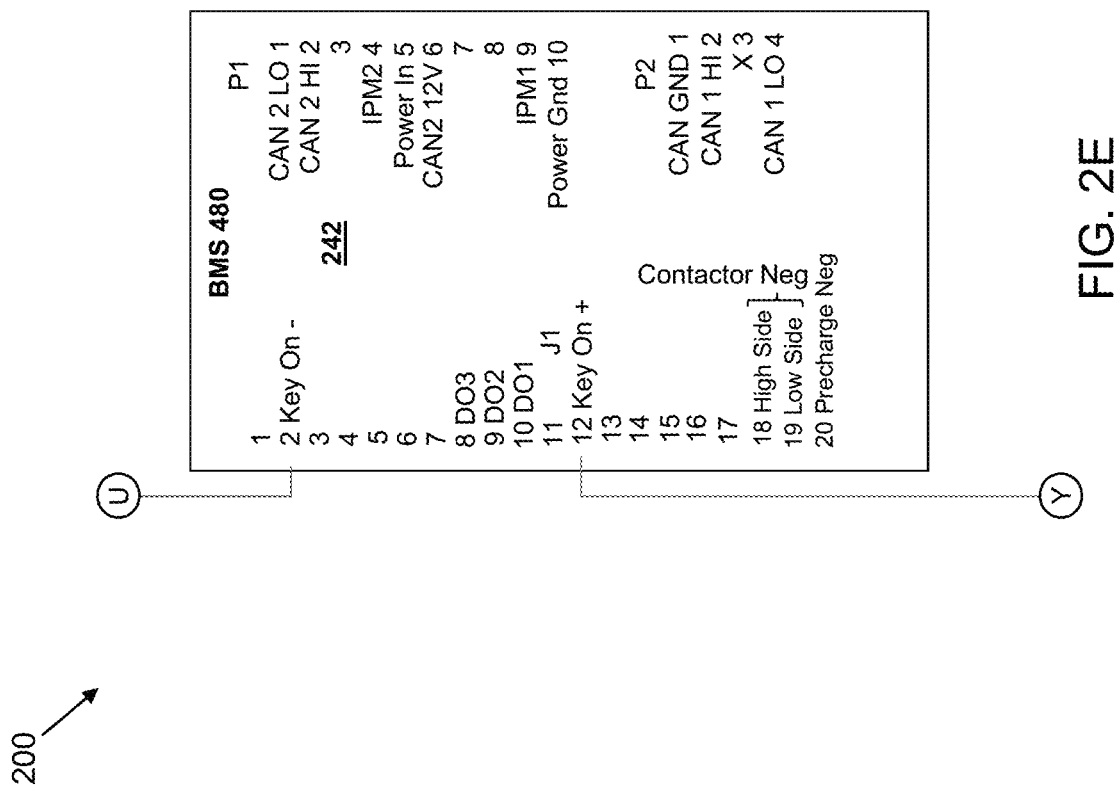
Figure 2F:
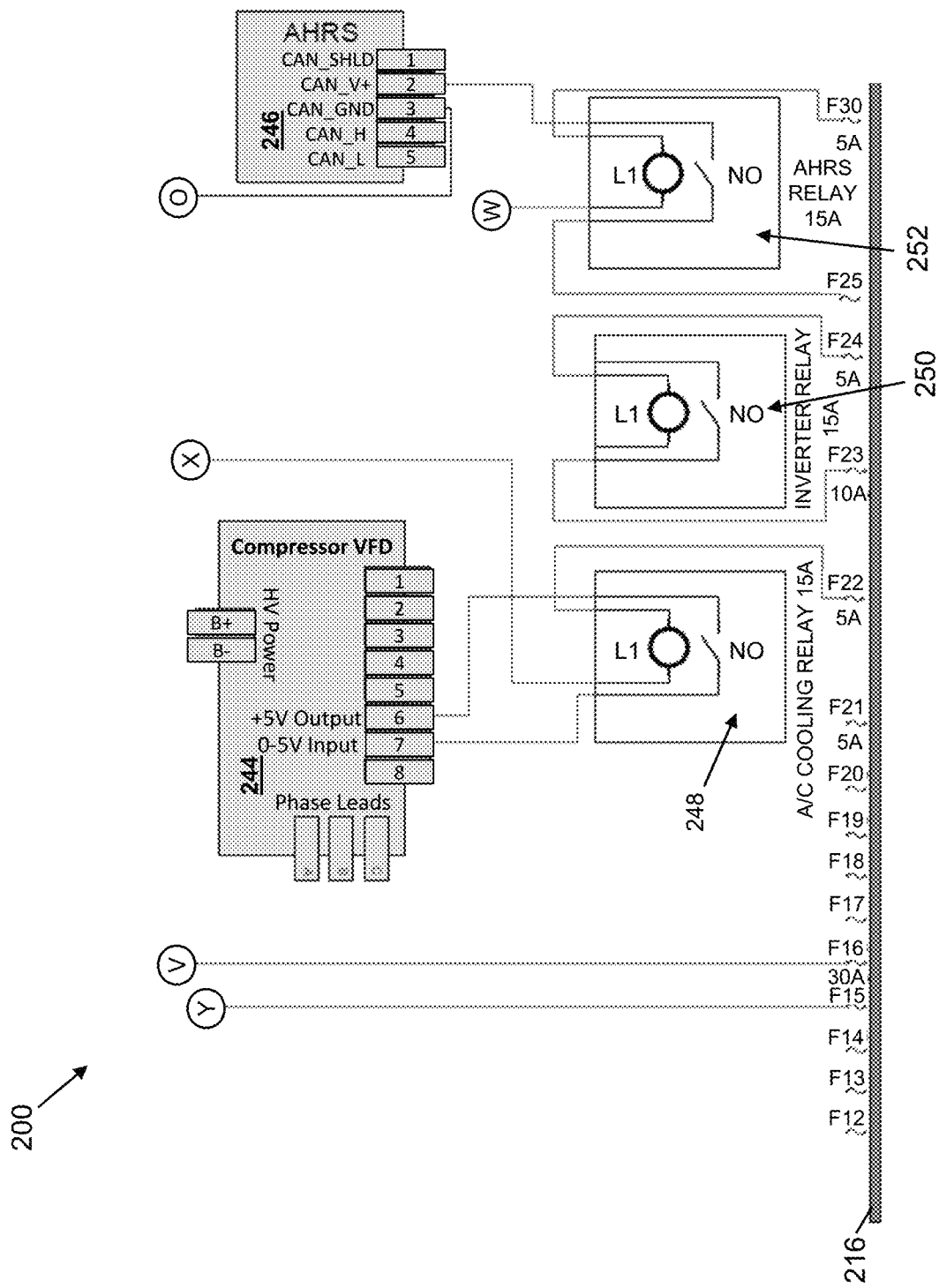

In addition to the master control unit 228, FIG. 2D illustrates a DC-DC power supply 230 coupled to a DC-DC control relay 236, a brake pressure sensor 232 coupled to the master control unit 228, a ground fault detector (GFD) 234 coupled to a battery management system (BMS)/GFD relay 240, and the AC motor controller relay 238. The DC-DC power supply 230 may be coupled to the voltage supply 216 (and thus enabled) by way of the DC-DC control relay 236, which is coupled to and actuated by a master control unit 228. Similarly, the GFD 234 and a "Key On−" input of a BMS 242 (FIG. 2E) may be coupled to the voltage supply 216 by way of the BMS/GFD relay 240, which is also coupled to and actuated by the master control unit 228. The AC motor controller 202 may also be coupled to the voltage supply 216 (and thus enabled) by way of the AC motor controller relay 238, which is also coupled to and actuated by the master control unit 228. In various embodiments, the DC-DC power supply 230 and the master control unit 228 may communicate with other components of the control system circuit 200 by way of the CAN bus, as discussed below. FIG. 2E shows the "Key On−" input of a BMS 242 coupled to the BMS/GFD relay 240, as discussed above. In addition, a "Key On+" input of the BMS 242 may be coupled directly to the voltage supply 216, as shown in FIG. 2F. In some embodiments, the BMS 242 may also communicate with other components of the control system circuit 200 by way of the CAN bus, as discussed below.

Referring specifically to FIG. 2F, illustrated therein is a compressor 244 coupled to a cooling relay 248, an attitude and heading reference system (AHRS) 246 coupled to an AHRS relay 252, and an optional inverter relay 250. By way of example, the compressor may include a variable frequency drive (VFD) or variable speed drive (VSD) compressor. The compressor 244 may be coupled to the voltage supply 216 (and thus enabled) by way of the cooling relay 248, which is coupled to and actuated by a master control unit 228. Similarly, the AHRS 246 may be coupled to the voltage supply 216 (and thus enabled) by way of the AHRS relay 252, which is coupled to and actuated by a master control unit 228. In some embodiments, the AHRS 246 may communicate with other components of the control system circuit 200 by way of the CAN bus, as discussed below. In various embodiments, the control system circuit 200 further includes an inverter, as shown below in FIG. 4, that may be coupled to the DC-DC power supply 230 and which may be optionally enabled/disabled using the inverter relay 250 by the master control unit 228. Moreover, in various embodiments, the inverter is coupled to the electric motor-generator 204 to provide power to, or receive power from, the electric motor-generator 204. It is again noted that the description of the control system circuit 200 is merely exemplary, and other aspects, advantages, and useful components will be evident to those skilled in the art, without departing from the scope of this disclosure. For example, in various embodiments, the control system circuit 200 may also include one or more of a fuse and relay module, a 12 volt battery, a fuse block, one or more battery disconnect switches, one or more electrical contactors, a pre-charge resistor, and/or other components as known in the art.

Figure 3:
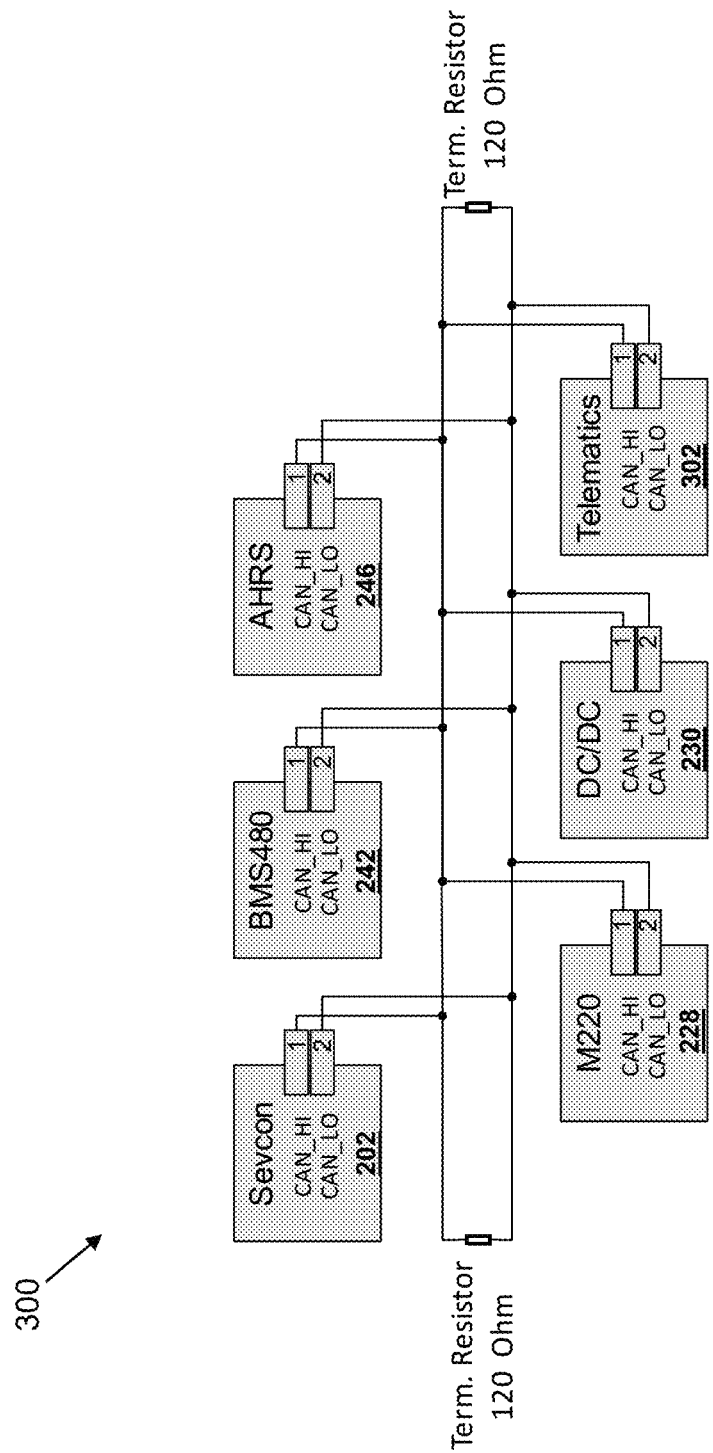
FIG. 3 depicts an exemplary controller area network (CAN bus) that may be used for communication of the various components of the control system circuit of FIGS. 2A-2F, in accordance with some embodiments.

With reference now to FIG. 3, illustrated therein is a controller area network (CAN bus) 300 used for communication of the various components of the control system circuit 200 with one another. Generally, a CAN bus is a vehicle bus standard designed to allow microcontrollers and other devices such as electronic control units (ECUs), sensors, actuators, and other electronic components, to communicate with each other in applications without a host computer. In various embodiments, CAN bus communications operate according to a message-based protocol. Additionally, CAN bus communications provide a multi-master serial bus standard for connecting the various electronic components (e.g., ECUs, sensors, actuators, etc.), where each of the electronic components may be referred to as a 'node'. In various cases, a CAN bus node may range in complexity, for example from a simple input/output (I/O) device, sensors, actuators, up to an embedded computer with a CAN bus interface. In addition, in some embodiments, a CAN bus node may be a gateway, for example, that allows a computer to communicate over a USB or Ethernet port to the various electronic components on the CAN network. In various embodiments, CAN bus nodes are connected to each other through a two wire bus (e.g., such as a 120Ω nominal twisted pair) and may be terminated at each end by 120Ω resistors.

In particular, the CAN bus 300 is illustrated as a linear bus terminated at each end by 120Ω resistors. In some embodiments, the CAN bus 300 includes an ISO 11898-2 high speed CAN bus (e.g., up to 1 Mb/s). By way of example, the CAN bus 300 is shown as including as nodes, for example, the AC motor controller 202, the BMS 242, the AHRS 246 (sensor), the master control unit 228, the DC-DC power supply 230 (actuator), and telematics unit 302 (smart sensor). In some embodiments, the telematics unit 302 may include a global positioning system (GPS), an automatic vehicle location (AVL) system, a mobile resource management (MRM) system, a wireless communications system, a radio frequency identification (RFID) system, a cellular communications system, and/or other telematics systems. In some embodiments, the telematics unit 302 may also include the AHRS 246. In accordance with various embodiments, at least some of the sensors, actuators, and other electronic components which are not included (e.g., shown in FIG. 3) as CAN bus nodes, may themselves be coupled to the CAN bus 300 by way of one or more of the CAN bus nodes. For example, a voltage meter (sensor), a current meter (sensor), and one or more electrical contactors (actuators) may be coupled to the CAN bus 300 by way of the BMS 242. Similarly, the water pump 206 (actuator), the water fan 208 (actuator), the oil pump 210 (actuator), the oil fan 212 (actuator), the GFD 234 (sensor), an inverter, the brake pressure sensor 232, a trailer weight sensor, as well as other actuators, sensors, and/or electronic components may be coupled to the CAN bus 300 by way of the master control unit 228. In some examples, the electric motor-generator 204 (actuator) is coupled to the CAN bus 300 by way of the AC motor controller 202. In some embodiments, a CANbus or SAE J1939 interface may be provided to other systems, such as those of a powered vehicle to facilitate read-type access to operating parameters or otherwise observable states of systems thereof.

Figure 4:
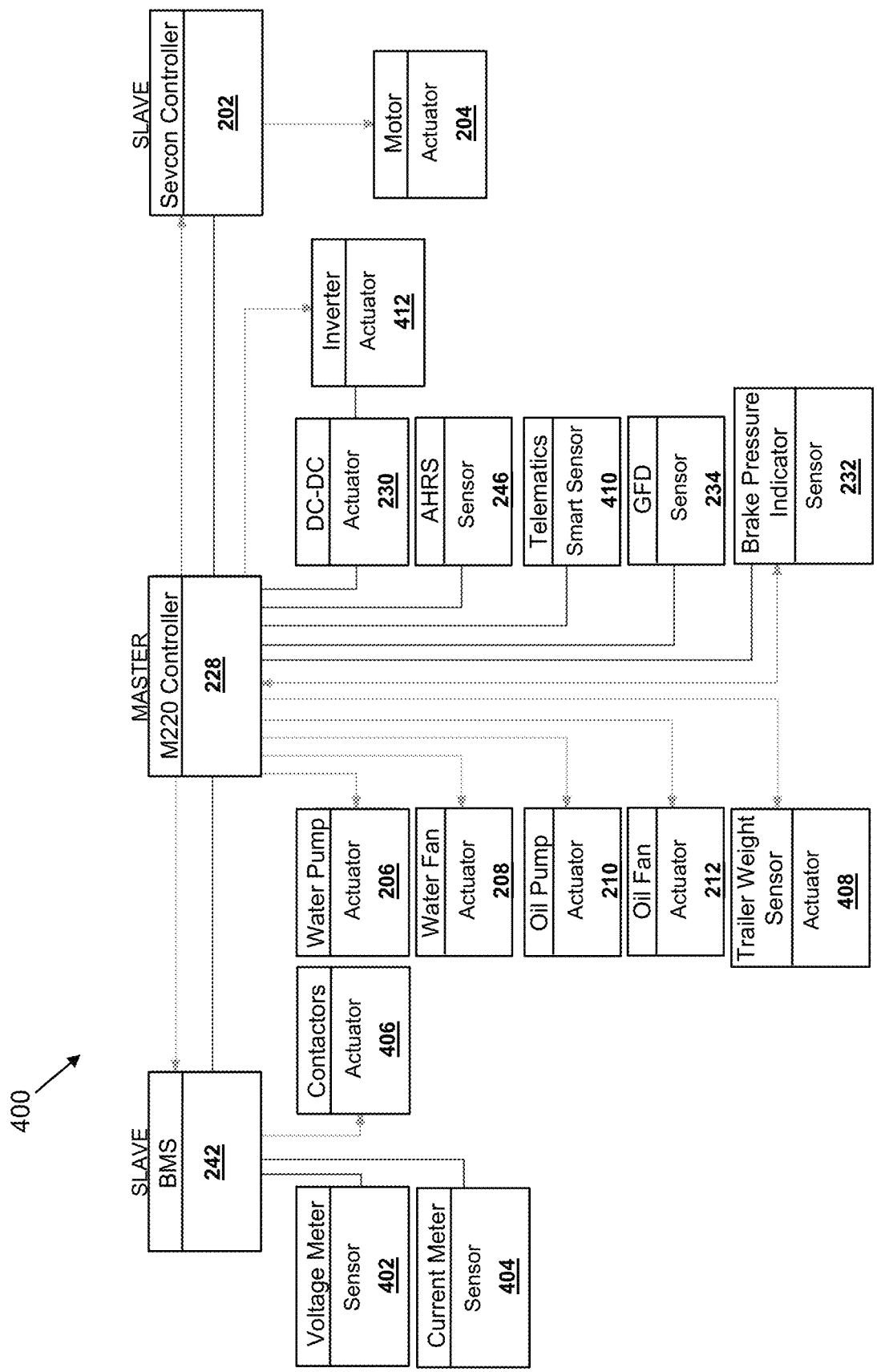
FIG. 4 is a functional block diagram of a hardware and/or software control system, in accordance with some embodiments.

Referring now to FIG. 4, illustrated therein is control system diagram 400 which provides further detail regarding connections and/or communication between and among the various control system components, some of which have been shown and described above (e.g., as part of the control system circuit 200 and/or the CAN bus 300). By way of example, the control system diagram 400 shows that the master control unit 228 is configured to operate as a Master' controller, while each of the BMS 242 and the AC motor controller 202 are configured to operate as 'Slave' controllers and are thereby under control of the master control unit 228. In some embodiments, and as illustrated in the control system diagram 400, the master control unit 228 provides for control (e.g., actuation of and/or receipt of a sensor output) for each of the water pump 206, the water fan 208, the oil pump 210, the oil fan 212, a trailer weight sensor 408, the DC-DC power supply 230, an inverter 412, the AHRS 246, a telematics unit 410, the GFD 234, and the brake pressure sensor 232. Additionally, the BMS 242 provides for control (e.g., actuation of and/or receipt of a sensor output) for each of a voltage meter 402, a current meter 404, and one or more electrical contactors 406. In some embodiments, the AC motor controller 202 provides for control (e.g., actuation) of the electric motor-generator 204, as discussed above.

Control Methods, Generally

Various aspects of the hybrid suspension system 100 and the TTR hybrid system 101 have been described above, including aspects of the control system architecture and related components. It particular, it has been noted that the hybrid suspension system 100 and the TTR hybrid system 101 are operated, by way of the control system 150 and suitable program code, in at least three modes of operation: (i) a power assist mode, (ii) a regeneration mode, and (iii) a passive mode. In at least some embodiments, the program code used to operate the control system 150 may reside on a memory storage device within the master control unit 228 (FIG. 2D). In addition, the master control unit 228 may include a microprocessor and/or microcontroller operable to execute one or more sequences of instructions contained in the memory storage device, for example, to perform the various methods described herein. In some cases, one or more of the memory storage, microprocessor, and/or microcontroller may reside elsewhere within the hybrid suspension system 100, within the TTR hybrid system 101 or even at a remote location that is in communication with the hybrid suspension system 100 or TTR hybrid system 101. In some embodiments, a general purpose computer system (e.g., as described below with reference to FIG. 7) may be used to implement one or more aspects of the methods described herein.

A variety of control systems designs are contemplated and will be appreciated by persons of skill in the art having benefit of the present disclosure. For example, in some embodiments, control system 150 is programmed to apply an equivalent consumption minimization strategy (ECMS) or adaptive ECMS type control strategy to modulate the motive force or torque provided, at an electrically driven axle(s), as a supplement to motive force or torques that control system 150 estimates are independently applied using the fuel-fed engine and primary drivetrain of the powered vehicle. In some embodiments, control system 150 is programmed to operate conjunction with an altitude and heading reference system (AHRS). Exemplary ECMS type and AHRS type control strategies are now described.

Figure 5A:
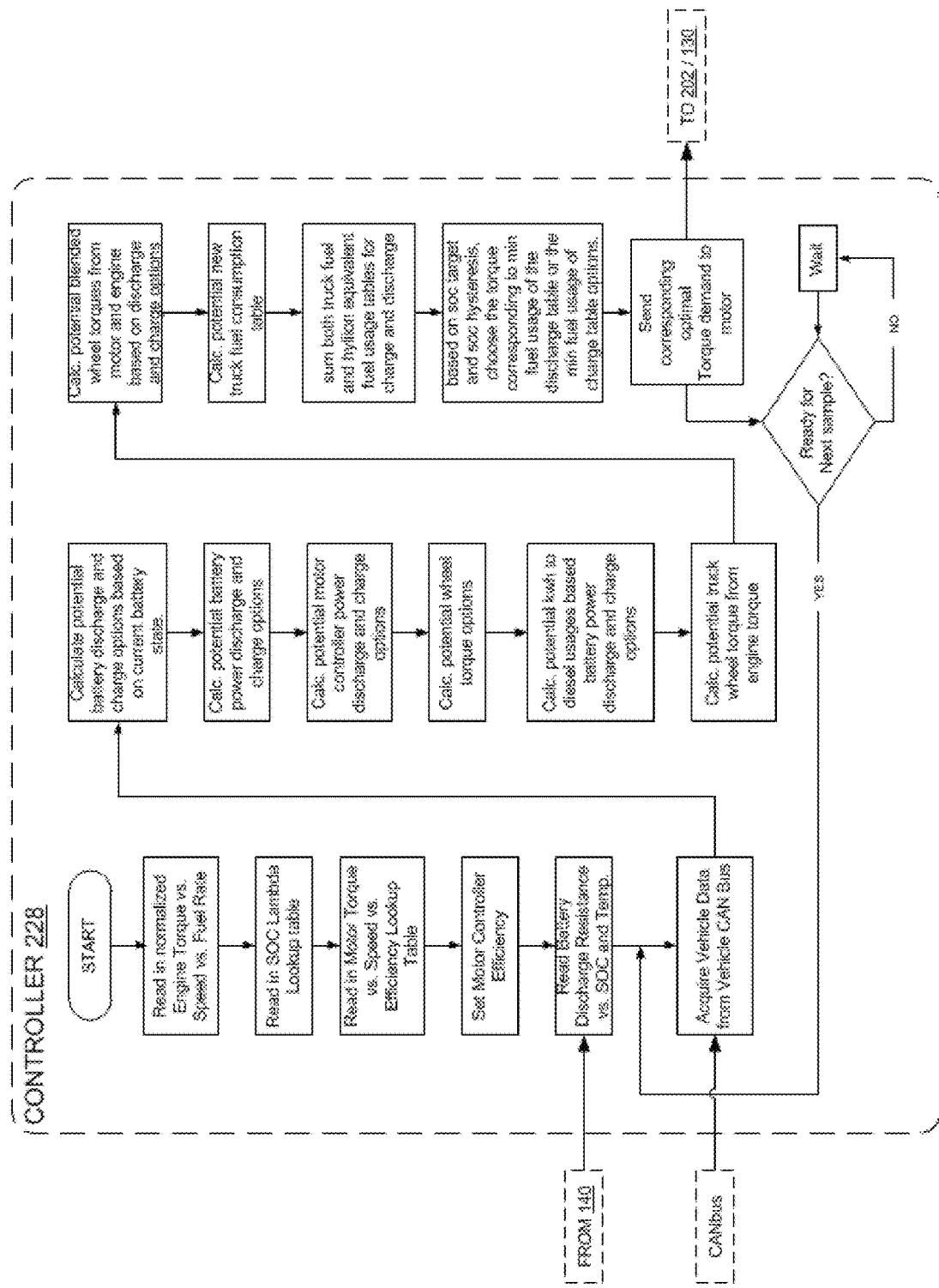
FIG. 5A is a flow diagram that illustrates a control strategy employed in certain equivalent consumption minimization strategy (ECMS) or adaptive ECMS-type controller designs that may be employed in a hybrid suspension system and/or a TTR hybrid system, in accordance with some embodiments.

FIG. 5A is a flow diagram that illustrates computations of a controller that applies an equivalent consumption minimization strategy (ECMS) to the hybrid suspension system 100 or TTR hybrid system 101 designs previously explained. Interactions of a programmed controller 228 with battery array 140, with a vehicle CANbus (for retrieval of operating conditions indicative of current torque delivered by fuel-fed engine through the primary drive train and current gear ratios of that primary drivetrain), and ultimately with electric motor-generator 130 via any local controller (e.g., sevcon controller 202) are all illustrated.

Based on the current SOC for battery array 140, an array of possible options for amperage discharge and charge values are calculated. These possibilities are converted to kW power as potential battery power discharge and charge possibilities. Battery inefficiencies and motor controller inefficiencies are considered along with possible electric drivetrain gear ratios to arrive at the corresponding potential electric motor torques that can be applied and resultant wheel torques which can be applied to the vehicle using electric motor-generator 130. Using the battery power discharge and charge possibilities, a corresponding diesel usage table is calculated using a lookup table that stores values for battery power equivalence based on various SOC conditions of battery array 140.

Based on current operating parameters retrieved from the vehicle CANbus (e.g., engine torque and current gear ratios in the primary drivetrain) or optionally based on estimates calculated based on a high-precision inertial measurement unit (IMU) effective torque delivered at vehicle wheels by the fuel-fed engine and the primary drivetrain is calculated or otherwise computationally estimated at controller 228. Potential supplemental torques that can be provided at wheels driven (or drivable) by electric motor-generator 130 are blended with those calculated or estimated for vehicle wheels driven by the fuel-fed engine and primary drivetrain in a calculation that back-calculates where the various additional supplemental torques would place the vehicle's engine. Then, based on these new values for the fuel-fed engine and primary drivetrain, a vehicle fuel usage consumption table is updated and, in turn, combined with (computationally summed) a charge/fuel usage table for electric motor-generator 130. Based on the current SOC, SOC targets, and SOC hysteresis, a minimum index value from the discharge fuel usage table or the charge fuel usage table is used. A motor torque at this index is retrieved from the motor torque possibilities table, and this torque demand is sent to electric motor-generator 130 via any local controller (e.g., sevcon controller 202) to be applied as supplemental torque via the electric drivetrain in a TTR hybrid configuration.

Figure 5B:
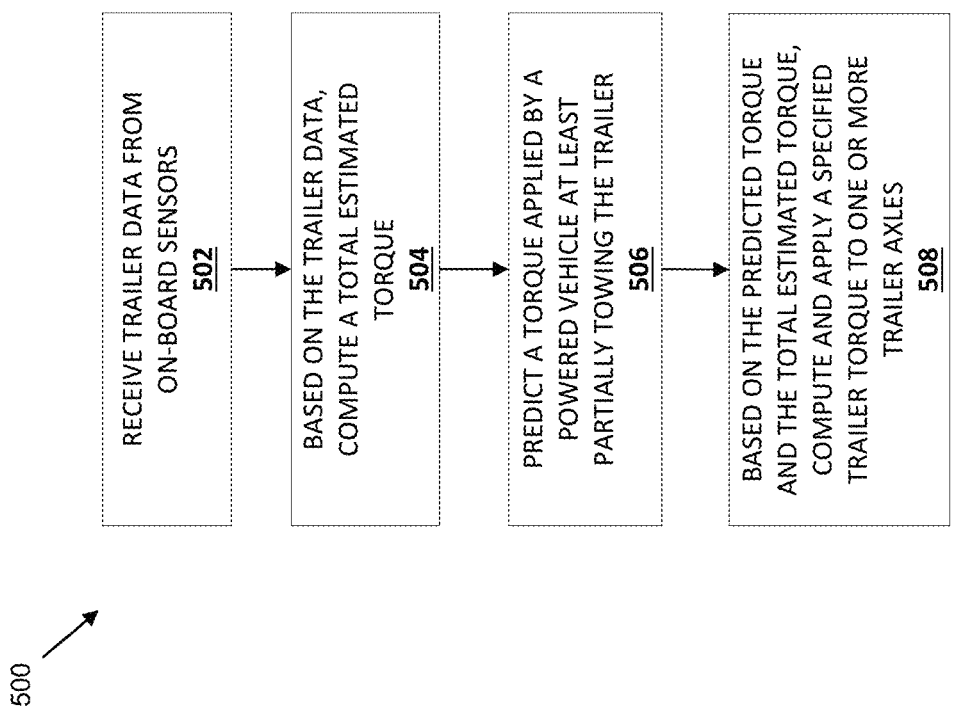
FIG. 5B is a flow diagram that illustrates a method for controlling a hybrid suspension system and/or a TTR hybrid system, in accordance with some embodiments.

Turning to FIG. 5B, method 500 of controlling a hybrid suspension system, such as the hybrid suspension system 100 and/or the TTR hybrid system 101 described above with reference to FIGS. 1A-1G. Generally, and in some embodiments, the method 500 provides a method for determining how much torque should be provided by the hybrid suspension system 100 and/or the TTR hybrid system 101, and as such in which mode to operate the hybrid suspension system 100 and/or the TTR hybrid system 101 (e.g., power assist, regeneration, or passive), in order to keep the hybrid suspension system 100, a trailer to which the hybrid suspension system 100 is coupled, and a powered vehicle towing the trailer (or a TTR hybrid system 101 itself), moving along their current trajectory at a substantially constant speed. Among other advantages, embodiments of the method 500 provide for a reduction in both fuel consumption and any associated vehicle emissions, and thus a concurrent improvement in fuel efficiency, of a powered vehicle towing the trailer, as well as improved vehicle acceleration, vehicle stability, and energy recapture (e.g., via regenerative braking).

It is also noted that while performing the method 500, aspects of the present disclosure may additionally receive data from, send data to, actuate, other otherwise interact with various components of the control system circuit 200 and the CAN bus 300, described above. Thus, one or more aspects discussed above may also apply to the method 500. Moreover, additional process steps may be implemented before, during, and after the method 500, and some process steps described above may be replaced or eliminated in accordance with various embodiments of the method 500.

Referring now to the method 500, the method 500 begins at block 502 where trailer data is received from one or more on-board sensors. As used herein, the term "on-board sensors" may be used to describe sensors that are coupled to or part of the hybrid suspension system 100, sensors that are coupled to or part of a trailer to which the hybrid suspension system 100 is attached, as well as remote sensors that may communicate (e.g., by way of cellular, wireless, RF, satellite, or other such communication) data to a receiver or transceiver that is coupled to or part of the hybrid suspension system 100 or the trailer. In some embodiments, the described sensors may be coupled to or part of the TTR hybrid system 101 and/or may be coupled to or part of the tractor 165 or other vehicle to which the TTR hybrid system 101 is attached. In various embodiments, the sensors may include one or more of a brake pressure sensor (e.g., such as the brake pressure sensor 232), an altitude and heading reference system (e.g., such as the AHRS 246), one or more smart sensors (e.g., such as the telematics unit 302) which may include a global positioning system as well as other smart sensors and/or telematics systems as described above, a trailer weight sensor which may include an air bag pressure sensor (e.g., provided in a suspension assembly of the towed vehicle) or other type of weight sensor, a speed sensor, a gyroscope, an accelerometer, a magnetometer, a lateral acceleration sensor, a torque sensor, an inclinometer, and/or other suitable sensor. In various embodiments, the sensed trailer data is sent to the master control unit 228 for further processing. For example, in some embodiments, the received trailer data (e.g., the sensor output) may be filtered to smooth the sensor data and thereby mitigate anomalous sensor values. In some cases, such filtering and smoothing may be accomplished using moving averages and Kalman filters, although other smoothing and/or filtering techniques may also be used. In at least some examples, an estimated braking torque is obtained from the brake pressure sensor, an estimated weight of the trailer is obtained from the air bag pressure sensor, and a trailer acceleration and roadway incline are both obtained from the AHRS.

The method 500 then proceeds to block 504 where based at least in part on the trailer data, a total estimated torque is computed. In some embodiments, the total estimated torque includes an estimated torque to maintain movement of the hybrid suspension system 100, and a trailer to which the hybrid suspension system 100 is coupled, along their current trajectory at a substantially constant speed. In embodiments when the trailer is at least partially towed by a powered vehicle, the total estimated torque further includes an estimated torque to maintain movement of the hybrid suspension system 100, the coupled trailer, and the powered vehicle, along their current trajectory at a substantially constant speed. For purposes of this discussion, the hybrid suspension system 100, the coupled trailer, and the powered vehicle may be collectively referred to as "a hybrid trailer vehicle system (HTVS)". Thus, in some embodiments, the tractor-trailer vehicle 160 of FIG. 1C may be referred to as an HVTS.

In some embodiments, for example when the tractor 165 is driven without the attached trailer, the total estimated torque may include an estimated torque to maintain movement of the tractor 165 (e.g., the powered vehicle) along its current trajectory at a substantially constant speed. In some embodiments, when the trailer is at least partially towed by a powered vehicle, one or more computations may be performed with respect to each of the hybrid suspension system 100 and the TTR hybrid system 101 so as to cooperatively determine an estimated torque to be applied at each of the hybrid suspension system 100 and the TTR hybrid system 101 to maintain movement of the HTVS along its current trajectory at a substantially constant speed.

In an embodiment of block 504, computing the total estimated torque may include computing one or more of a plurality of forces acting on the HTVS. For example, computing the total estimated torque may include computing a driver input torque (e.g., throttle/braking of the powered vehicle), an air drag torque, a road drag torque, a road grade torque, and an acceleration torque, among others. In some embodiments, the air drag torque and the road drag torque may be dependent on a speed at which the HTVS is traveling. In some cases, the road grade torque may be dependent on an incline/decline of a roadway on which the HTVS is traveling. By way of example, the driver of the powered vehicle of the HTVS may actuate an air brake system. In such cases, embodiments of the present disclosure may utilize an air brake pressure to calculate a braking torque component of the total estimated torque. In some embodiments, the driver input torque may be substantially equal to a sum of the air drag torque, the road drag torque, the road grade torque, and the acceleration torque. In various embodiments, the total estimated torque computed at block 504 may include a currently-applied (e.g., instantaneous) HTVS torque. Based in part on the total estimated torque and an estimate and/or prediction of a driver-applied torque, as discussed in more detail below, a specified torque may be applied by way of the hybrid suspension system 100 to one or more trailer axles. Moreover, in some embodiments and based in part on the total estimated torque and an estimate and/or prediction of a driver-applied torque, a specified torque may be applied by way of one or both of the hybrid suspension system 100 and the TTR hybrid system 101.

The method 500 then proceeds to block 506 where a torque applied by a powered vehicle towing the trailer is computationally estimated (e.g., by the control system 150). Stated another way, in embodiments of block 506, a torque applied by a driver of the powered vehicle (e.g., by applying throttle or braking) is estimated, for example, as a result of the hybrid suspension system 100 being autonomous from the powered vehicle and thus not having direct feedback regarding driver inputs (e.g., throttle/braking). In some embodiments, a driver-applied torque may also be estimated, for example, by the TTR hybrid system 101. In some embodiments, the driver-applied torque may also be predicted. Thus, in some examples, a currently-applied torque may be estimated and a subsequently applied torque may be predicted. In some embodiments, the estimated and/or predicted driver-applied torque may be based on a plurality of factors such as past driver behavior, current driver behavior, road conditions, traffic conditions, weather conditions, and/or a roadway grade (e.g., road incline or decline). As used herein, the term "driver behavior" may be used to describe a driver's operation of the powered vehicle, for example, including application of throttle, braking, steering, as well as other driver-controlled actions. Additionally, and in various embodiments, at least some of the factors used to estimate and/or predict the driver-applied torque may include data received from one or more of the on-board sensors, described above, including GPS or inclinometer data that may be used to determine a present roadway grade and/or predict an upcoming roadway grade. For example, if the upcoming roadway grade includes a positive grade (e.g., an incline), the driver may in some embodiments be expected to apply additional throttle. In some cases, if the upcoming roadway grade includes a negative grade (e.g., a decline), the driver may in some embodiments be expected to apply the brakes (e.g., of the powered vehicle). In some embodiments, if the upcoming roadway grade is substantially flat, the driver may in some embodiments be expected to neither apply additional throttle nor apply the brakes. In some examples, at least some of the factors used to estimate and/or predict the applied torque may further include traffic data, weather data, road data, or other similar data. Similarly, if the upcoming roadway includes heavy traffic, poor road conditions (e.g., pot holes, unpaved sections, etc.), or if weather has caused hazardous driving conditions (e.g., rain, flooding, strong crosswinds, etc.), the driver may in some embodiments be expected to apply the brakes. Thus, in accordance with some embodiments, knowledge of an upcoming roadway grade, combined with a plurality of other data (e.g., traffic, weather, road data) and the driver's current and/or past behavior may be used to estimate and/or predict the driver-applied torque. It will be understood that the driver behaviors discussed above, with respect to roadway grade and road/weather conditions, are merely exemplary. Various other behaviors (e.g., apply throttle during a negative grade or apply brakes during a positive grade) are possible as well, without departing from the scope of the present disclosure.

The method 500 then proceeds to block 508 where based at least in part on the estimated and/or predicted torque (block 506) and the total estimated torque (block 504), a specified trailer torque is computed and applied to one or more of the trailer axles. In some cases, a torque to apply to the electric axle of the tractor 165 is computed and applied. In particular, the specified trailer torque is applied to the one or more of the trailer axles by way of the hybrid suspension system 100, as described herein. In some cases, based at least in part on the estimated and/or predicted torque (block 506) and the total estimated torque (block 504), a specified torque may be computed and applied to the electric axle of the tractor 165 by way of the TTR hybrid system 101. Additionally, in an embodiment of block 508, the hybrid suspension system 100 and/or the TTR hybrid system 101 areoperated in the appropriate one of the at least three modes of operation (e.g., power assist, regeneration, or passive) in order to provide the specified trailer torque and/or torque to the electric axle of the tractor 165. In some embodiments, the specified trailer torque or torque to apply to the electric axle of the tractor 165 is computed, at least in part, by utilizing the estimated and/or predicted driver-applied torque in an energy optimization algorithm that utilizes an equivalent consumption minimization strategy (ECMS) to simultaneously optimize the fuel consumption of the powered vehicle and the energy usage (e.g., battery charge) of the hybrid suspension system 100 and/or the TTR hybrid system 101.

Figure 5C:
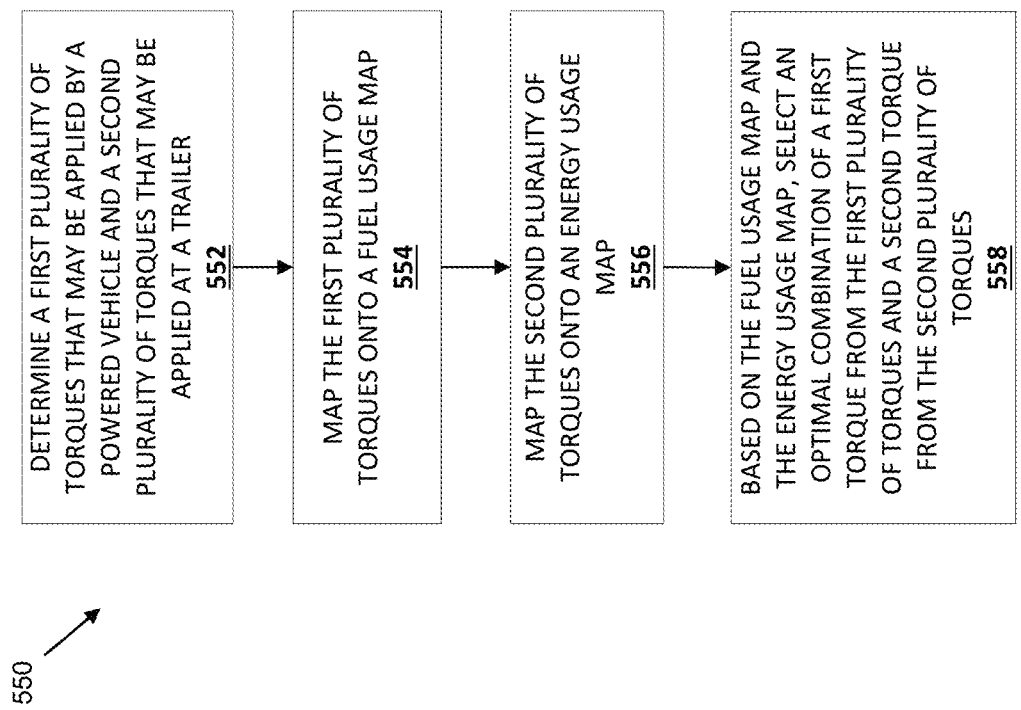
FIG. 5C is a flow diagram that illustrates additional aspect of a method such as illustrated in FIG. 5B for controlling the hybrid suspension system and/or a TTR hybrid system, in accordance with some embodiments.

An aspect of the energy optimization algorithm is illustrated in more detail in FIG. 5C, which provides a method 550. In some embodiments, the method 550 may be performed as part of, or in addition to, the method 500. For example, in some cases, the method 550 may be performed as part of block 508 of the method 500, where the specified torque is computed and applied to the one or more trailer axles, and/or to the electric axle of the tractor 165. By way of example, the method 550 begins at block 552 where a first plurality of torques that may be applied by the powered vehicle, and a second plurality of torques that may be applied at the trailer, and/or to the electric axle of the tractor 165 (e.g., applied by the electric motor-generator), are determined. In some embodiments, the first plurality of torques may include a range of torque values which the powered towing vehicle is capable of providing (e.g., by way of a fuel-consuming engine, an electric motor, or other means of providing a motive force). Similarly, and in some embodiments, the second plurality of torques may include a range of torque values which the hybrid suspension system 100 and/or the TTR hybrid system 101 is capable of providing (e.g., by way of the energy storage system and an integrally electric drive axle or the electric motor-generator coupled to one or more drive axles).

The method 550 then proceeds to block 554, where the first plurality of torques is mapped onto a fuel usage map. For example, in some embodiments, a difference between the total estimated torque (block 504) and the second plurality of torques (e.g., each torque of a range of possible torque values which the hybrid suspension system 100 and/or the TTR hybrid system 101 can provide) is determined, where the difference provides a set of corresponding torque values that would be provided by the powered vehicle (e.g., by the fuel-fed engine of the powered vehicle). In various embodiments, the set of corresponding torque values may be used to generate a torque-to-fuel usage map for the powered vehicle. At block 556 of the method 550, the second plurality of torques may be used to similarly generate a torque-to-energy usage map for the hybrid suspension system 100 and/or the TTR hybrid system 101.

Thereafter, at block 558 of the method 550, an optimal combination of a first torque from the first plurality of torques, and a second torque from the second plurality of torques, is selected. By way of example, and in an embodiment of block 558, the torque-to-energy usage map may be converted to another torque-to-fuel usage map, so that mappings of the powered vehicle and the hybrid suspension system 100 and/or the TTR hybrid system 101 may be more readily compared. In some cases, the torque-to-fuel usage map corresponding to the hybrid suspension system 100 and/or the TTR hybrid system 101 is subtracted from the torque-to-fuel usage map corresponding to the powered vehicle (e.g., the fuel-fed engine of the powered vehicle), thereby resulting in a combined powered vehicle/hybrid suspension system usage map. Thereafter, in some embodiments, an optimal (e.g., minimum) fuel usage from the combined usage map is determined, including a corresponding index value. In some cases, the corresponding index value is then used to select an optimal torque value for the hybrid suspension system 100 and/or the TTR hybrid system 101 from the torque-to-energy usage map, and the optimal torque value for the hybrid suspension system 100 and/or the TTR hybrid system 101 is applied, in an embodiment of both blocks 508 and 558. In a more general sense, embodiments of the present disclosure may be used to estimate a current torque demand of the HTVS. Using the estimated torque demand, at least some embodiments may be used to determine an amount of fuel efficiency gain (e.g., of the powered vehicle) and/or energy efficiency gain (e.g., of the hybrid suspension system 100 and/or the TTR hybrid system 101) that may be achieved by operating the hybrid suspension system 100 and/or the TTR hybrid system 101 in a particular mode, while applying a particular torque, thereby providing for selection of the optimal torque value for the hybrid suspension system 100 and/or the TTR hybrid system 101.

With reference now to FIG. 6A, illustrated therein is an exemplary functional block diagram 600 for controlling the hybrid suspension system 100, described above. In particular, the block diagram 600 illustrates exemplary relationship, in at least some embodiments, among various components of an HVTS, such as the tractor-trailer vehicle 160 of FIG. 1C. Moreover, at least some aspects of the methods 500, 550, discussed above, may be better understood with reference to FIG. 6A. For example, FIG. 6A illustrates the autonomous nature of the hybrid suspension system 100, where the hybrid suspension system 100 is able to operate without direct commands or signals from the powered towing vehicle (e.g., such as the tractor 165), to independently gain information about itself, the trailer 170, and the environment (e.g., by way of the trailer sensing system), and to make decisions and/or perform various functions based on one or more algorithms stored in the control system 150.

The autonomous nature of the hybrid suspension system 100 is further exemplified, in at least some embodiments, by the functional block diagram 600 including two separate control loops, a hybrid suspension system control loop 610 and a powered towing vehicle control loop 620. In the powered vehicle control loop 620, a driver 622 may apply a throttle 624 or a brake 626, which is then applied to the powered vehicle (e.g., such as the tractor 165). In various embodiments, a response of the powered vehicle to the applied throttle 624/brake 626 (e.g., acceleration/deceleration of the powered vehicle) may be provided as feedback to the driver 622, which the driver 622 may then further respond to by applying additional throttle 624 or brake 626, or neither throttle 624/brake 626. In some examples, the powered vehicle may also provide feedback (e.g., to the driver 622) via throttle 624/brake 626 inputs.

Independent from the powered vehicle control loop 620, the hybrid suspension control loop 610 may operate in a substantially similar manner to the methods 500, 550 described above. For example, in at least some embodiments, the hybrid suspension control system 150 may receive trailer data from a trailer sensor system 602, which may include any of the one or more sensors discussed above. In some cases, the trailer sensor system 602 may include the on-board sensors discussed above. In some embodiments, the control system 150 may compute a total estimated torque and computationally estimate a torque applied by the powered vehicle 165 (e.g., which may include estimating throttle and/or braking). In some embodiments, based on the total estimated torque and the computationally estimated torque of the powered vehicle, a specified trailer torque may be computed and applied to the one or more trailer axles 120, by way of the electric motor-generator 130. In various examples, the driven one or more trailer axles 120 may provide feedback to the control system 150, for further computation and application of torque. In some cases, the one or more driven trailer axles 120 may also provide feedback to the electric motor-generator 130. In at least some embodiments, the hybrid suspension system 100 may sense one or more pneumatic brake lines from the powered vehicle.

Referring to FIG. 6B, illustrated therein is an exemplary functional block diagram 630 for controlling the TTR hybrid system 101, described above. In particular, the block diagram 630 illustrates exemplary relationship, in at least some embodiments, among various components of a tractor, such as the tractor 165 of FIG. 1D-1G. Some aspects of the methods 500, 550, discussed above, may be further elaborated upon and understood with reference to FIG. 6B. For example, FIG. 6B illustrates the loosely coupled or generally autonomous nature of the TTR hybrid system 101, where the TTR hybrid system 101 is able to operate without direct commands or signals from the driver or other components of the powered vehicle, to independently gain information about itself, the tractor 165, and the environment (e.g., by way of the sensing system), and to make decisions and/or perform various functions based on one or more algorithms stored in the control system 150. To be sure, in some embodiments, the TTR hybrid system 101 may retrieve and/or share data, for example, via the CAN bus of the tractor 165.

The loosely-coupled or generally autonomous nature of the TTR hybrid system 101 is further exemplified, in at least some embodiments, by the functional block diagram 630 including two separate control loops, an TTR hybrid system control loop 640 and the powered vehicle control loop 620, which is substantially as described above. Independent from the powered vehicle control loop 620, the TTR hybrid system control loop 640 may operate in a substantially similar manner to the methods 500, 550 described above. For example, in at least some embodiments, the control system 150 may receive tractor data from a sensor system 602 (e.g., which may be part of the TTR hybrid system 101 and/or coupled to the tractor 165), which may include any of the one or more sensors discussed above. In some cases, the sensor system 602 may include the on-board sensors discussed above. In some embodiments, the control system 150 may compute a total estimated torque and computationally estimate a torque applied by the engine of the tractor 165. In some embodiments, based on the total estimated torque and the computationally estimated torque of the powered vehicle, a specified torque may be computed and applied to one or more electric axles of the tractor 165, by way of one or more electric motor-generators 130, as shown in FIGS. 1D-1G. In various examples, the electric axle of the tractor 165 may provide feedback to the control system 150, for further computation and application of torque. In some cases, the one or more electric axles of the tractor 165 may also provide feedback to the one or more electric motor-generators 130. In at least some embodiments, the TTR hybrid system 101 may sense one or more pneumatic brake lines.

With reference to FIG. 6C, illustrated therein is an exemplary functional block diagram 650 for controlling both the hybrid suspension system 100 and the TTR hybrid system 101, described above. In particular, the block diagram 650 illustrates exemplary relationship, in at least some embodiments, among various components an HVTS, where the hybrid suspension system 100 and the TTR hybrid system 101 may be cooperatively operated. Some aspects of the methods 500, 550, discussed above, may be further elaborated upon and understood with reference to FIG. 6C.

In particular, the cooperative operation of the hybrid suspension system 100 and the TTR hybrid system 101, together with the powered vehicle engine, is illustrated by the functional block diagram 650. As shown in FIG. 6C, the functional block diagram 650 includes three separate control loops, the hybrid suspension system control loop 610, the TTR hybrid system control loop 640, and the powered vehicle control loop 620. Independent from the powered vehicle control loop 620, each of the hybrid suspension control loop 610 and the TTR hybrid system control loop 640 may operate in a substantially similar manner as described above. In some embodiments, the hybrid suspension system control loop 610 and the TTR hybrid system control loop 640 may share a control system 150 (e.g., housed within one of the hybrid suspension system 100 or the TTR hybrid system 101), or each of the control loops 610, 640 may utilize separate control systems 150 (e.g., housed within each of the hybrid suspension system 100 and the TTR hybrid system 101). Moreover, in some embodiments, the control system 150 may receive sensor data from the sensor system 602, where the sensors may be housed and/or coupled to one or more of the trailer, the tractor, the hybrid suspension system 100, and the TTR hybrid system 101.

In various embodiments, the control system 150 may compute a total estimated torque and computationally estimate a torque applied by the engine of the tractor 165. In some embodiments, based on the total estimated torque and the computationally estimated torque of the powered vehicle (e.g., the engine of the tractor 165), a specified torque may be computed and applied to one or more electric axles of the tractor 165, as well as to the one or more trailer axles 120, by way of one or more electric motor-generators 130. In various examples, the electric axle of the tractor 165 and the one or more trailer axles 120 may provide feedback to the control system 150, for further computation and application of torque. In some cases, the one or more electric axles of the tractor 165 and the one or more trailer axles 120 may also provide feedback to the one or more electric motor-generators 130.

Control Methods, Examples and Further Discussion

The hybrid suspension system 100 and/or the TTR hybrid system 101 may be used, for example together with aspects of the control methods described above, to operate in a variety of different modes (e.g., power assist, regeneration, and passive modes) and thus perform a variety of different functions. In various examples, the hybrid suspension system 100 may be used to provide a power boost (e.g., to the HVTS) during acceleration and/or when going up an incline by operating in the power assist mode, thereby depleting energy from the energy storage system. In addition, the hybrid suspension system 100 and/or the TTR hybrid system 101 may replenish that energy by operating in the regeneration mode (e.g., using regenerative braking) when decelerating and/or when going down a decline. As discussed above, operation in one of the various modes may be determined according to a variety of inputs and/or data (e.g., from sensors, calculated values, etc.) such as discussed above. In various examples, the hybrid suspension system 100 and/or the TTR hybrid system 101 and associated methods may provide, among other benefits, optimal application of power (e.g., as discussed in the example below), increased fuel mileage, decreased fuel emissions, and superior load stabilization. Of particular note, embodiments of the hybrid suspension system 100 and/or the TTR hybrid system 101 described herein are configured to operate generally independently of the powered vehicle to which the trailer may be attached. Thus, any type of powered vehicle may hook up and tow a trailer, including the hybrid suspension system 100 attached thereunder, and the hybrid suspension system 100 will automatically adapt to the powered vehicle's behavior. Similarly, embodiments of the TTR hybrid system 101 are configured to replace a passive axle of any type of tractor with an electric axle, as described above, and operate generally independent of and adapt to the behavior (e.g., throttle/braking) of the tractor.

With respect to optimal application of power as discussed above, there are scenarios in which battery power could be used most effectively at a given time, for example, knowing that battery power may be (i) regenerated in the near future (e.g., based on an upcoming downhill roadway grade) or (ii) needed in the near future (e.g., based on an upcoming uphill roadway grade). Such information (e.g., regarding the upcoming roadway) may be gathered from GPS data, inclinometer data, and/or other sensor data as described above. In some embodiments, the hybrid suspension system 100 and/or the TTR hybrid system 101 may alternatively and/or additionally periodically query a network server, or other remote sever/database, to provide an upcoming roadway grade.

For purposes of illustration, consider an example where an HTVS is traveling along substantially flat terrain, while the battery array 140 of the hybrid suspension system 100 is at about a 70% state of charge (SOC). Consider also that there is an extended downhill portion of roadway coming up that would provide for regeneration about 40% SOC of the battery array 140 (e.g., while operating the hybrid suspension system 100 in the regeneration mode). Absent knowledge of the upcoming extended downhill portion of the roadway, some embodiments may operate in the passive mode on the substantially flat terrain, while beginning to regenerate the battery array 140 once the HTVS reaches the extended downhill portion of roadway. In such cases, about 30% SOC may be regenerated before the battery array 140 is fully charged. Thus, the system may not be able to regenerate further, and about 10% SOC that could have been captured may be lost.

In some embodiments, the predictive road ability discussed herein provides knowledge of the upcoming extended downhill portion of roadway. As such, the hybrid suspension system 100 may autonomously engage the power assist mode while traveling along the substantially flat terrain, such that about 10% SOC of the battery array 140 is used prior to reaching the extended downhill portion of roadway, thereby improving fuel efficiency of the HTVS (e.g., while on the substantially flat terrain), while still regenerating about 30% SOC while traveling along the extended downhill portion. Such system operation, including the predictive road ability, advantageously provides for both improved fuel efficiency of the HTVS efficient use of the battery array 140 (e.g., as it may be undesirable to have the battery array nearly full or nearly empty when there is an opportunity to regenerate or provide power assistance).

In another example, consider a case where the battery array 140 is at about 10% SOC and the HTVS is traveling along substantially flat terrain. Consider also that an extended uphill portion of roadway is coming up that would optimally be able to use about 20% SOC of the battery array 140 (e.g., while operating the hybrid suspension system 100 in the power assist mode). Once again, absent knowledge of the upcoming extended uphill portion of the roadway, some embodiments may operate in the passive mode on the substantially flat terrain, while beginning to use energy (e.g., operating in the power assist mode) once the HTVS reaches the extended uphill portion of the roadway. Thus, in such an example, the battery array 140 may expend its 10% SOC before the hybrid suspension system 100 may not be able to assist further. Stated another way, about 10% SOC that could have been effectively used by the HTVS while traveling along the extended uphill portion of the roadway is not available.

As discussed above, the predictive road ability provides knowledge of the upcoming extended downhill portion of roadway. As such, the hybrid suspension system 100 may autonomously engage the regeneration mode while traveling along the substantially flat terrain, such that about 10% SOC of battery array 140 is regenerated, for a total of about 20% SOC, prior to reaching the extended uphill portion of the roadway. While this may result in a temporary decrease in fuel efficiency, the efficiency gains afforded by operating the hybrid suspension system 100 in the power assist mode for the duration of the extended uphill portion of the roadway (e.g., and optimally using the 20% SOC of the battery array 140) outweigh any potential efficiency reductions that may occur by regenerating on the substantially flat terrain. While the examples above were described primarily with reference to the hybrid suspension system 100, it will be understood that similar predictive road ability, and associated benefits, may be similarly employed using the TTR hybrid system 101.

In addition to using the various sensors, data, networking capabilities, etc. to determine whether the HTVS is traveling along substantially flat terrain, uphill, or downhill, embodiments of the present disclosure may be used to determine whether the HTVS is hitting a bump or pothole, turning a corner, and/or accelerating. By accounting for dynamics of the trailer and measuring angles and accelerations (e.g., in 3-dimensional space), embodiments of the present disclosure may provide for measurement of: (i) acceleration, deceleration, and angle of inclination of the trailer (e.g., by taking readings lengthwise), (ii) side-to-side (e.g., turning force) motion and banking of a roadway (e.g., by taking readings widthwise), (iii) smoothness of the roadway, pot holes, and/or wheels riding on a shoulder (side) of the road (e.g., by taking readings vertically). Utilizing such information, embodiments of the present disclosure may be used to brake wheels individually, for example, while still supplying power (e.g., by the power assist mode) to other wheels, thereby increasing trailer stability. In addition, and in some embodiments, by monitoring the acceleration, axle speed and incline of the roadway over time and by applying an incremental amount of torque and measuring the response in real time, the controller may back-calculate a mass of the trailer load. In some embodiments, a weight sensor may also be used, as described above. In either case, such information may be used by the system for application of a proper amount of torque to assist in acceleration of the HTVS without over-pushing the powered vehicle.

In some examples, the system may further be used to monitor one or more pneumatic brake lines, such that embodiments of the present disclosure provide a 'fail safe' mode where the hybrid suspension system 100 and/or the TTR hybrid system 101 will not accelerate (e.g., operate in a power assist mode) while a driver (e.g. of the powered vehicle) is actuating a brake system. In various embodiments, by monitoring feedback pressure of each wheel's brake lines, as well as their respective wheel speeds, the present system can determine how each brake for a particular wheel is performing. Thus, in various examples, embodiments of the present disclosure may provide for braking and/or powering of different wheels independently from one another for increased trailer stability. In some cases, this may be referred to as "torque vectoring". By way of example, such torque vectoring embodiments may be particularly useful when there are differences in roadway surfaces upon which each of a plurality of wheels of the HTVS is traveling (e.g., when roadway conditions are inconsistent, slippery, rough, etc.).

In various embodiments, embodiments disclosed herein may further be employed to recapture energy via regenerative braking, as described above. In some examples, the application of the brakes, and/or various combinations of deceleration, axle speed, trailer weight and incline/decline readings may dictate, at least in part, an ability and amount of regeneration possible by the hybrid suspension system 100 and/or the TTR hybrid system 101. In various embodiments, regenerative braking may persist until the energy storage system is fully charged, until a predetermined minimum level of stored energy has been achieved, or until the powered trailer axle has reached a minimum threshold rotational speed. Additionally, for example in some extreme conditions, different amounts of braking may be applied to each wheel in order to reduce a potential of jack-knifing or other dangerous conditions during operation of the HTVS. As a whole, regenerative braking may be used to lighten a load on a mechanical braking system (e.g., on the powered vehicle and/or on the trailer), thereby virtually eliminating a need for a loud compression release engine brake system (e.g., Jake brake system). In some cases, by applying both regenerative braking and friction braking, the HTVS may be able to brake much faster and have shorter stopping distances. In addition, and in various embodiments, the present system may be deployed with two pneumatic brake lines (e.g., which may including existing brake lines), while an entirety of the controls (e.g., including sensor input processing, mode of operation control, aspects of the various methods described above, and other decision-making controls) may reside entirely within the hybrid suspension system 100 and/or the TTR hybrid system 101 itself (e.g., and in many respects, within the control system 150).

Energy Capture and Management, Further Discussion

With respect to energy recapture, the above discussion is primarily directed to charging the energy storage system (e.g., the battery array) by regenerative braking; however, other methods of energy recapture are possible and within the scope of this disclosure. For example, in some embodiments, a hydraulic system (e.g., used to capture energy via air pressure or fluid pressure), flywheels, solar panels, or a combination thereof may be used for energy recapture. Additionally, in some cases, the HVTS 160 may include shocks (e.g., as part of a suspension of the powered vehicle, of the hybrid suspension system 100, and/or of the TTR hybrid system 101), which may include regenerative shock absorbers, that may be used to capture electrical energy via the motion and/or vibration of the shocks. In some embodiments, energy captured by one or more of the above methods may be used to charge the energy storage system.

Further, embodiments disclosed herein may use the recaptured energy not only to apply the motive rotational force using the electric motor-generator, but also to provide power that may be used for powering a host of devices and/or systems, both on the trailer and on the powered vehicle. For example, the recaptured energy may be used to power a lift gate, a refrigeration unit, a heating ventilation and air conditioning (HVAC) system, pumps, lighting, appliances, entertainment devices, communications systems, other 12V-powered devices, and/or to provide an auxiliary power unit (APU), among others. Regardless of where the power is being provided, embodiments disclosed herein provide for energy storage and management to be on-trailer as part of the hybrid suspension system 100, and/or on the powered vehicle as part of the TTR hybrid system 101.

When configured to provide an APU, the HVTS 160 may include an APU interface to provide power from the energy storage system (e.g., the battery array) to the powered vehicle to power one or more devices and/or systems on the powered vehicle. In some embodiments, the APU interface may include an SAE J2891 interface. In various examples, the APU interface may physically couple to an electrical interface on the powered vehicle so that power from the energy storage system may be transferred to the powered vehicle. In some embodiments, an inverter, such as the inverter described above, may be coupled between the energy storage system and the APU interface to supply AC power to the powered vehicle. In some cases, a step-down DC-DC power supply may be coupled between the energy storage system and the APU interface to supply DC power to the powered vehicle. In some embodiments, an electrical cable may be used to transfer electrical power from the energy storage system (on the towed vehicle or on the powered vehicle) to the powered vehicle and for bi-directionally conveying data between the powered vehicle and at least a battery management system of the hybrid suspension system 100 and/or the TTR hybrid system 101.

In at least some embodiments, a control interface is provided in the powered towing vehicle. By way of example, the control interface may be coupled to the battery management system of the hybrid suspension system 100 and/or the TTR hybrid system 101. In various embodiments, the control interface may provide an in-towing-vehicle (e.g., within a cab of the powered vehicle) display of state of charge for the energy storage system of the hybrid suspension system 100 and/or the TTR hybrid system 101, a switch or control of a switch to enable and disable supply of electrical power to the powered towing vehicle, and/or mode control for selectively controlling an operating mode of the battery management system. In some embodiments, and in at least one selectable mode of the battery management system, energy recovered using the drive axle in a regenerative braking mode (or energy recovered using one of the other methods described above) is used to bring the energy storage system to a substantially full state of charge. Further, in some embodiments, and in at least another selectable mode of the battery management system, a state of charge of the energy storage system is managed to a dynamically varying level based at least in part on uphill and downhill grades along a current or predicted route of travel of the HVTS 160. In at least some embodiments, the control interface may be integrated with the HVAC system on the powered towing vehicle, the HVAC system powered from the energy storage system of the hybrid suspension system 100 and/or the TTR hybrid system 101 at least during some extended periods of time during which an engine of the towing vehicle is off (e.g., when the HVTS 160 is stopped at a rest area, weigh station, pick-up location, drop-off location, or other location).

Computer System for Implementing the Various Methods

Figure 7:
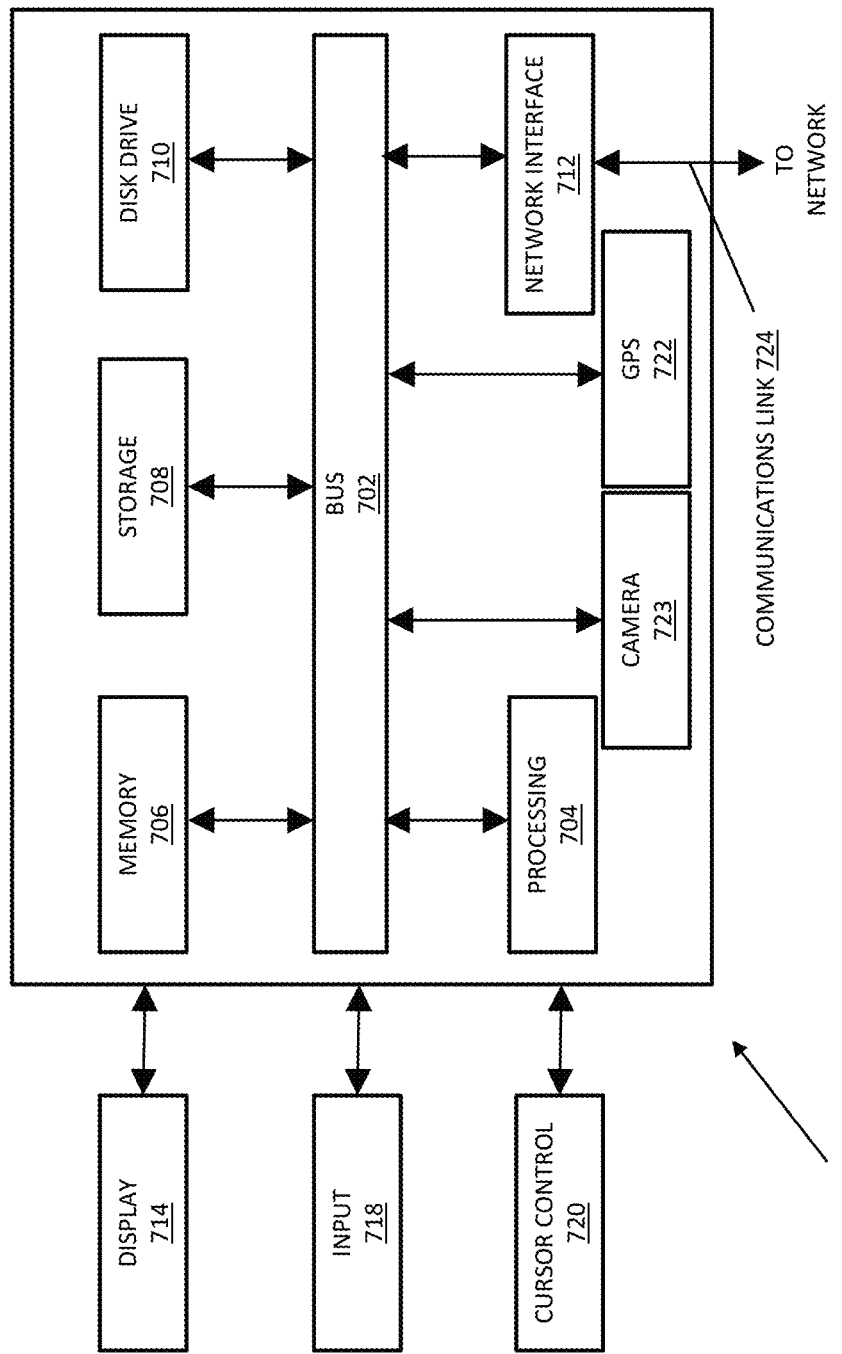
FIG. 7 illustrates an embodiment of an exemplary computer system suitable for implementing various aspects of the control system and methods of FIGS. 5A-5C, in accordance with some embodiments.

Referring now to FIG. 7, an embodiment of a computer system 700 suitable for implementing various aspects of the control system 150 and methods 500, 550, is illustrated. It should be appreciated that any of a variety of systems which are used for carrying out the methods described herein, as discussed above, may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722 (e.g., a Global Positioning System (GPS) device as illustrated, a cell tower triangulation device, and/or a variety of other location determination devices known in the art), and/or a camera component 723. In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the control system 150 and methods 500, 550. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to a network (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A vehicle energy management method, comprising:
receiving, from one or more on-board sensors, trailer data including at least one of trailer position data, trailer weight data, trailer speed data, and trailer acceleration data for the trailer traveling along a given trajectory;
based at least in part on the received trailer data, computing a total estimated torque to maintain movement of the trailer along the given trajectory at a substantially constant speed;
computationally estimating a torque applied by a powered vehicle towing the trailer; and
based on the computationally estimated torque applied by the powered vehicle and on the computed total estimated torque, applying a specified trailer torque to one or more trailer axles, wherein the specified trailer torque is provided by an electric motor-generator coupled to the one or more trailer axles.

2. The energy management method of claim 1, wherein the computing the total estimated torque includes computing one or more of a driver input torque, an air drag torque, a road drag torque, a road grade torque, an acceleration torque, and a braking torque.

3. The energy management method of claim 1, wherein the computationally estimating the torque includes computationally estimating the torque based on one or more of driver behavior, road conditions, traffic conditions, weather conditions, and roadway grade.

4. The energy management method of claim 1, further comprising:
installing, underneath the trailer, a hybrid suspension system including the electric motor-generator coupled to the one or more trailer axles; and
operating the hybrid suspension system in one of a power assist mode, a regeneration mode, and a passive mode of operation to provide the specified trailer torque.

5. The energy management method of claim 4, wherein the electric motor-generator provides, in the power assist mode of operation, an assistive motive force.

6. The energy management method of claim 4, wherein the electric motor-generator provides, in the regeneration mode of operation, a regenerative braking force.

7. The energy management method of claim 4, wherein the electric motor-generator provides, in the passive mode of operation, neither an assistive motive force nor a regenerative braking force.

8. The energy management method of claim 4, further comprising:
providing a battery array from which stored energy is supplied to the electric motor-generator in the power assist mode of operation and to which regenerated braking energy is supplied in the regeneration mode of operation;
wherein the specified trailer torque is selected so as to optimize energy usage of the battery array.

9. The energy management method of claim 8, wherein the powered vehicle consumes fuel, and wherein the specified trailer torque is selected so as to simultaneously optimize fuel consumption of the powered vehicle and the energy usage of the battery array.

10. The energy management method of claim 1, further comprising:
determining a first plurality of torques that the powered vehicle is operable to provide;
determining a second plurality of torques that the electric motor-generator is operable to provide;
based on the first plurality of torques, generating a first torque-to-fuel usage map for the powered vehicle; and
based on the second plurality of torques, generating a torque-to-energy usage map for the electric motor-generator.

11. The energy management method of claim 10, further comprising:
converting the torque-to-energy usage map into a second torque-to-fuel usage map; and
computing a difference between the first and second torque-to-fuel usage maps, thereby providing a combined usage map.

12. The energy management method of claim 11, further comprising:
determining, from the combined usage map, an index value corresponding to an optimal combined usage; and
based on the index value, selecting the specified trailer torque.

13. The energy management method of claim 12, wherein the specified trailer torque is selected, using the index value, from the torque-to-energy usage map.

14. The energy management method of claim 1, further comprising:
prior to computing the total estimated torque, filtering the trailer data received from the one or more on-board sensors.

15. The energy management method of claim 14, wherein the filtering is performed using at least one of a moving average and a Kalman filter.

16. A trailer for use in combination with a powered vehicle, the trailer comprising:
one or more on-board sensors configured to detect trailer data including at least one of trailer position data, trailer weight data, trailer speed data, and trailer acceleration data for the trailer traveling along a given trajectory;
a control system operable to compute, based at least in part on the trailer data, a total estimated torque to maintain movement of the trailer along the given trajectory at a substantially constant speed; and
an electric motor-generator coupled to one or more trailer axles, wherein the electric motor-generator is configured to provide a specified torque to the one or more trailer axles; wherein the control system is further operable to computationally estimating a torque applied by the powered vehicle towing the trailer; and wherein based on the computationally estimated torque applied by the powered vehicle and on the computed total estimated torque, applying the specified trailer torque to the one or more trailer axles.

17. The trailer of claim 16, further comprising:
a hybrid suspension system including the electric motor-generator coupled to the one or more trailer axles, wherein the hybrid suspension system is installed underneath the trailer; wherein the hybrid suspension system is configured to operate in one of a power assist mode, a regeneration mode, and a passive mode of operation to provide the specified trailer torque.

18. The trailer of claim 17, further comprising:
a battery array configured to supply stored energy to the electric motor-generator in the power assist mode of operation and configured to receive regenerated braking energy in the regeneration mode of operation;
wherein the specified trailer torque is selectable by the control system so as to optimize energy usage of the battery array.

19. The trailer of claim 18, wherein the powered vehicle is configured to consume fuel, and wherein the specified trailer torque is selectable by the control system so as to simultaneously optimize fuel consumption of the powered vehicle and the energy usage of the battery array.

20. The trailer of claim 16, in combination with the powered vehicle.

* * * * *